(12) United States Patent
Yasui

(10) Patent No.: US 7,305,819 B2
(45) Date of Patent: Dec. 11, 2007

(54) PLANT TEMPERATURE CONTROL SYSTEM

(75) Inventor: Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/316,992

(22) Filed: Dec. 27, 2005

(65) Prior Publication Data
US 2006/0142932 A1    Jun. 29, 2006

(30) Foreign Application Priority Data
Dec. 28, 2004    (JP) ............................. 2004-381323

(51) Int. Cl.
*F01N 3/00* (2006.01)
(52) U.S. Cl. ................. 60/285; 60/276; 60/277; 60/284; 700/31; 701/113; 701/114
(58) Field of Classification Search .......... 60/274, 60/276, 277, 284, 285, 300, 286; 701/101, 701/113, 114; 703/2, 8; 700/31
See application file for complete search history.

(56) References Cited

U.S. PATENT DOCUMENTS

| | | | |
|---|---|---|---|
| 5,544,639 A * | 8/1996 | Shouda et al. .............. | 123/676 |
| 5,857,163 A * | 1/1999 | Trombley et al. ........... | 701/101 |
| 6,145,302 A * | 11/2000 | Zhang et al. ................. | 60/274 |
| 6,276,128 B1 * | 8/2001 | Kammann et al. ............ | 60/274 |
| 6,286,305 B1 * | 9/2001 | Poublon et al. .............. | 60/285 |
| 6,463,732 B2 * | 10/2002 | Baeuerle et al. ............. | 60/274 |
| 6,758,039 B2 | 7/2004 | Kuboshima et al. | |
| 2003/0230079 A1 | 12/2003 | Kuboshima et al. | |

FOREIGN PATENT DOCUMENTS

| | | |
|---|---|---|
| JP | 2003-83035 | 3/2003 |
| JP | 2004-306646 | 11/2004 |
| JP | 2005-011036 | 1/2005 |
| WO | WO 2002/070873 | 9/2002 |

* cited by examiner

*Primary Examiner*—Binh Q. Tran
(74) *Attorney, Agent, or Firm*—Arent Fox LLP

(57) ABSTRACT

In a temperature control system of a plant such as an engine exhaust system, there are provided a catalyst heat model calculating a temperature estimated value of the plant, a temperature sensor model inputting the calculated value to calculate an output estimated value of a temperature sensor, a temperature controller controlling the plant temperature based on the estimated value, and a model parameter corrector correcting the plant model parameter so as to minimize error between the temperature sensor output and the calculated output estimated value. With this, even in the case where the temperature sensor has a large response lag, the temperature estimated value can nevertheless be corrected with high accuracy, without, for example, causing severe overshooting.

8 Claims, 24 Drawing Sheets

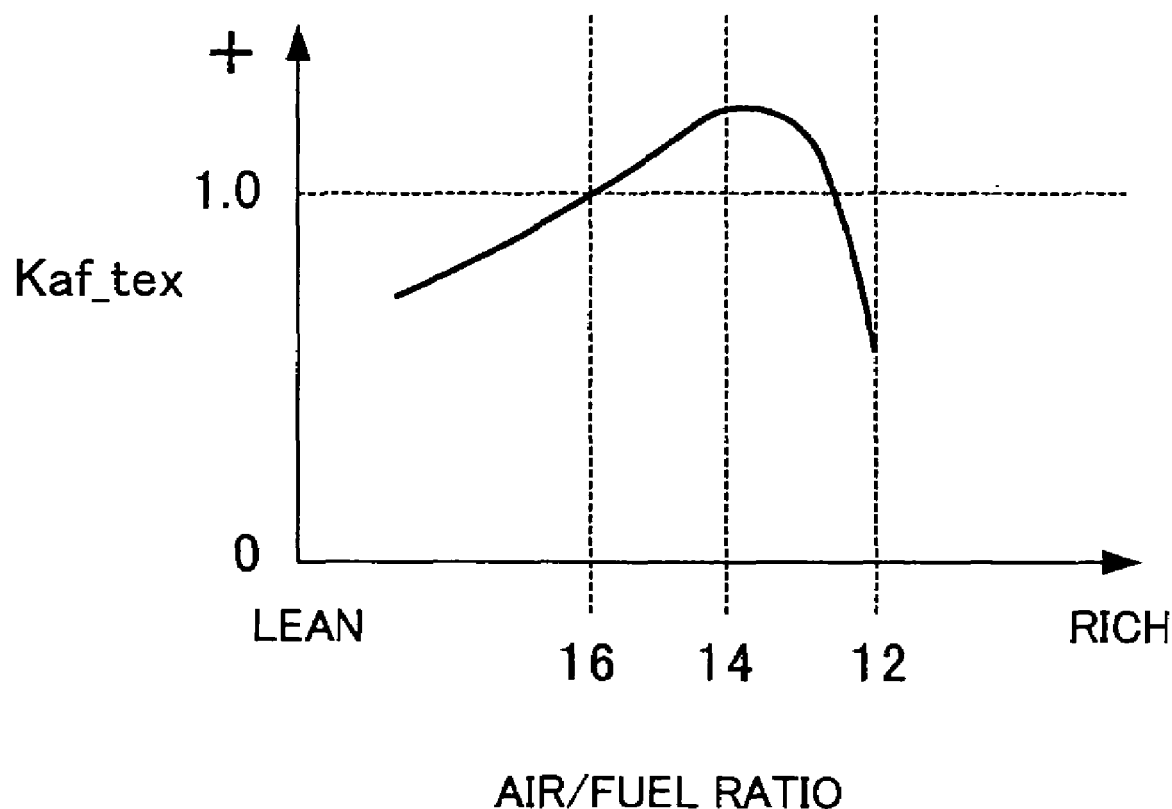

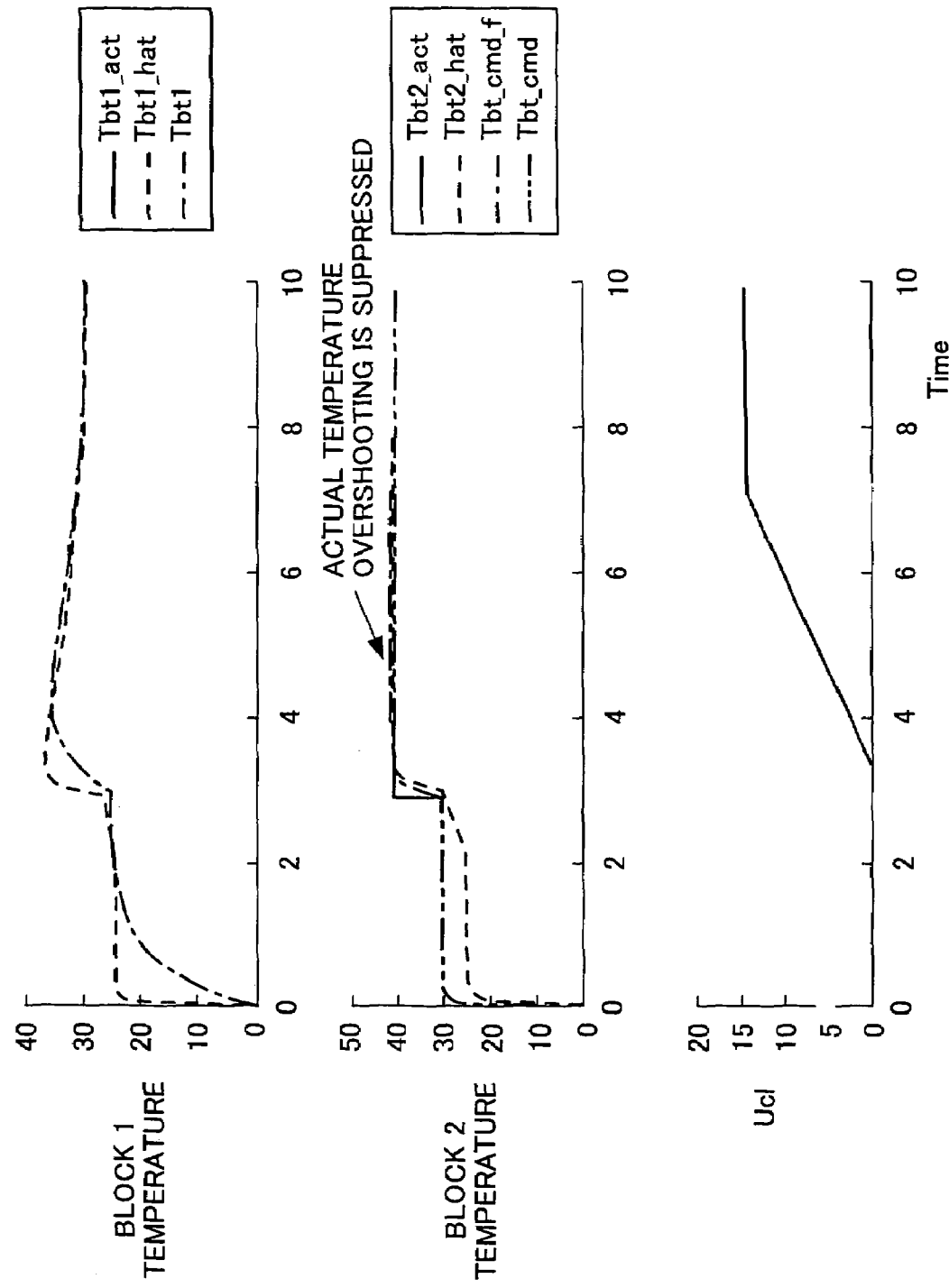

PLANT TEMPERATURE CONTROL SYSTEM

BACKGROUND OF THE INVENTION

1. Field of the Invention

This invention relates to a plant temperature control system.

2. Description of the Related Art

As taught by WO 2002/070873, for example, the temperature control of a catalytic converter (viewed as a plant) of an internal combustion engine can be achieved by defining a plant model for estimating the temperature of the catalytic converter and detecting catalytic converter deterioration by comparing the model output with the output of a temperature sensor installed in the catalytic converter. When the sensor output indicates a temperature lower than the light-off temperature of the catalytic converter, the conventional system uses the temperature sensor output to correct the temperature estimated by the model and controls the fuel quantity and ignition timing of the engine so as to maintain reduced catalyst temperature so long as deterioration of the catalytic converter continues to be observed.

However, the response of a temperature sensor that can bear up under the temperature fluctuation range of a vehicle exhaust system is usually very poor. Therefore, when the temperature estimated value of the plant model is corrected immediately using the output of the temperature sensor as described in the prior art, a miscorrection is liable to be made. A need is therefore felt for a plant temperature control system that enables accurate correction of the temperature estimated value produced by the plant model even when using a temperature sensor of inferior response.

SUMMARY OF THE INVENTION

An object of this invention is therefore to overcome the foregoing drawback by providing a plant temperature control system that accurately corrects the temperature estimated value produced by the plant model even when the response delay of the temperature sensor is large.

In order to achieve the object, this invention provides a system for controlling temperature of a plant, comprising: a temperature sensor producing an output indicative of a temperature of the plant; a plant model calculating a temperature estimated value of the plant; a temperature sensor model inputting the calculated temperature estimated value of the plant and calculating an output estimated value of the temperature sensor; a temperature controller controlling the temperature of the plant based on the calculated temperature estimated value of the plant; and a model parameter corrector correcting a parameter of the plant model so as to minimize error between the output of the temperature sensor and the calculated output estimated value of the temperature sensor.

BRIEF DESCRIPTION OF THE DRAWINGS

The above and other objects and advantages of the invention will be more apparent from the following description and drawings in which:

FIG. 11 is a graph showing the characteristics of an air/fuel ratio temperature correction coefficient Kaf_tex of the exhaust gas temperature base value Tex_base of the port section exhaust gas temperature estimated value Tex_hat, which is used in the configuration shown in FIG. 9;

FIG. 25 is a set of graphs showing simulation results in the case of using the configuration according to the fourth embodiment shown in FIG. 23.

DETAILED DESCRIPTION OF THE PREFERRED EMBODIMENTS

A plant temperature control system according to preferred embodiments of the present invention will now be explained with reference to the attached drawings.

Figure 1:
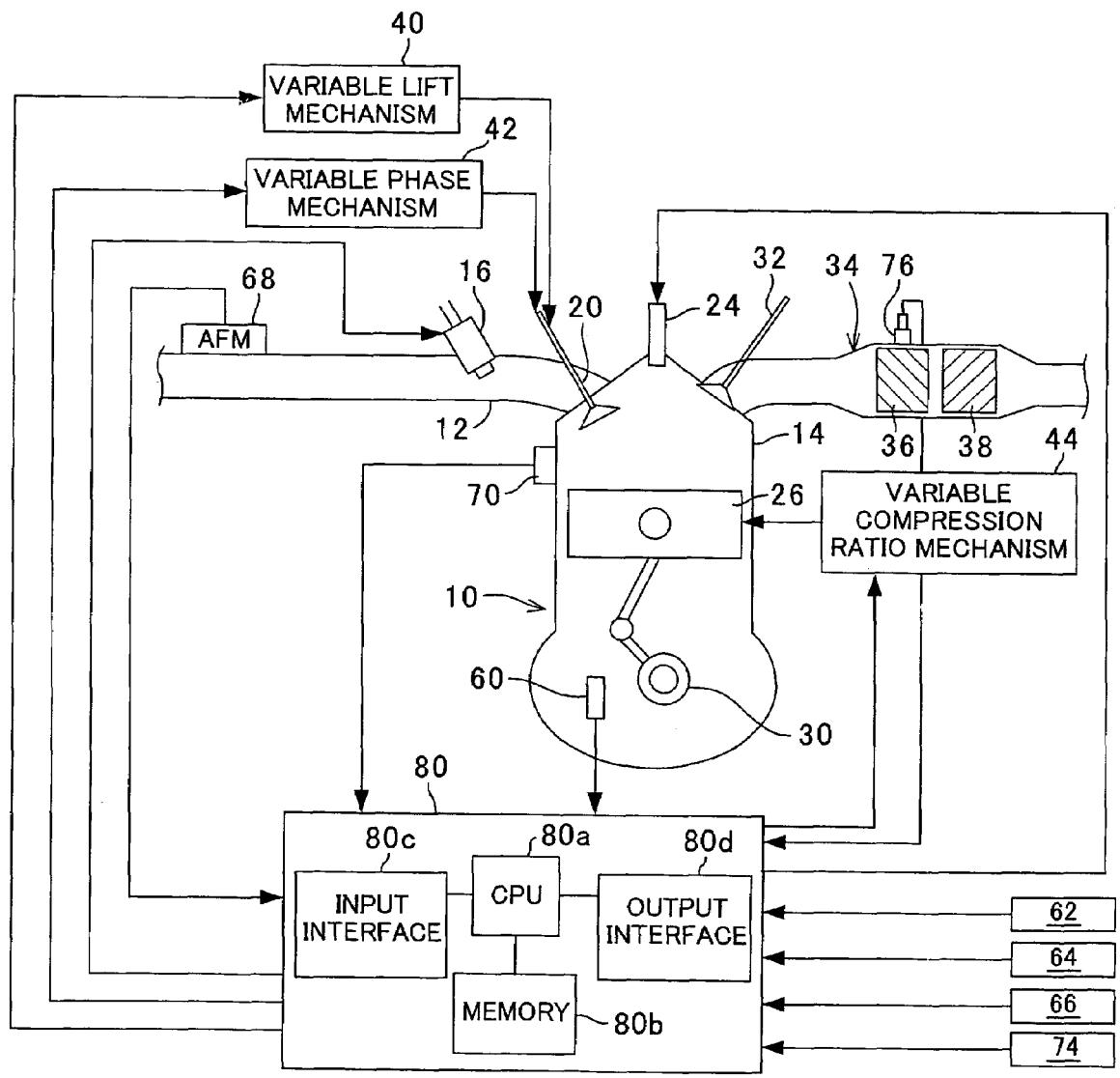
FIG. 1 is a schematic diagram showing the overall structure of a control system of an internal combustion engine including a plant temperature control system according to a first embodiment of this invention.

FIG. 1 is a schematic diagram showing the overall structure of a control system of an internal combustion engine including a plant temperature control system according to the preferred embodiment of the invention.

The symbol 10 in the drawing designates an internal combustion engine 10, specifically a four-cycle, four-cylinder, DOHC (double overhead cam), gasoline engine. The engine 10 is equipped with an air intake pipe 12. Air sucked into the air intake pipe 12 through an air cleaner (not shown) flows through an intake manifold (not shown). A fuel injector 16 is installed near the intake ports of each of the four cylinders 14 (only one shown). When energized, the injectors 16 inject fuel (gasoline) into the intake air. The engine 10 is a lean-burn engine that can be operated at the air/fuel ratio of 20:1.

When the two intake valves (only one shown) 20 closing the intake ports of a cylinder open, the air-fuel mixture produced by the injection of fuel flows into combustion chamber 22 of the associated cylinder to be ignited by a spark plug 24. The resulting explosive combustion drives a piston 26 downward as viewed in the drawing to rotate a crankshaft 30. When the two exhaust valves (only one shown) 32 closing the exhaust ports of the cylinder open, the burnt gas (exhaust gas) produced by the combustion passes through an exhaust manifold and an exhaust system 34 connected thereto to discharged to the exterior of the engine 10 after being purified by a first catalytic converter 36 and a second catalytic converter 38.

The first catalytic converter 36 at the upstream side comprises a NOx catalytic converter that selectively reduces the NOx component in the exhaust gas under the temperature of 400° C. or thereabout. The second catalytic converter 38 at the downstream side comprises oxidation catalytic converter that oxidizes CO and HC components in the exhaust gas under the lean atmosphere.

The engine 10 is equipped with a variable lift mechanism 40 for variably regulating the lift or valve opening height of the intake valves 20, a variable phase mechanism 42 for variably regulating the phase relationship between the intake camshaft and exhaust camshaft that drive the intake valves 20 and exhaust valves 32 (thereby regulating the timing of valve opening and closing), and a variable compression ratio mechanism 44 for variably regulating the compression ratio by changing the top dead center (and bottom dead center) of the pistons 26.

The variable lift mechanism 40 will be explained first.

Figure 2:
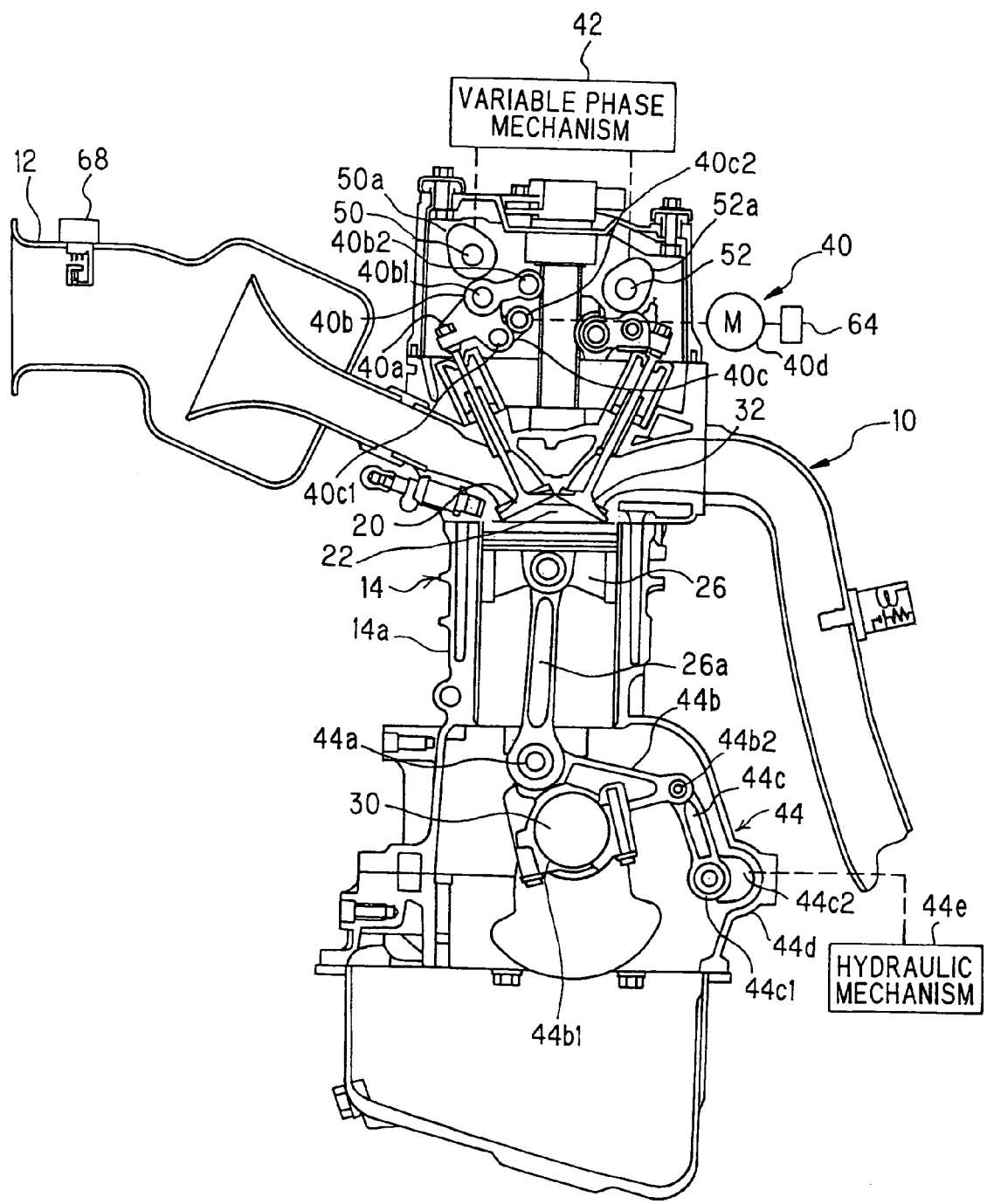
FIG. 2 is a side view specifically showing the engine shown in FIG. 1 with focus on a valve operating system.

FIG. 2 is side view showing the structure of the engine 10 of FIG. 1 more concretely with focus on the valve mechanism. As illustrated, an intake camshaft 50 and an exhaust camshaft 52 are installed in parallel above the intake valves 20 and exhaust valves 32. They are connected to the crankshaft 30 through timing belts or the like (not shown) so that each is rotated at one-half the rotational speed of the crankshaft 30.

Intake cams 50a are attached to the intake camshaft 50. A rocker arm 40a is provided near each intake cam 50a with its one end in contact with the intake cam 50a and its other end in contact with the tip of the stem of the associated intake valve 20. An upper link arm 40b is connected to the rocker arm 40a by a link pin 40b1 and a lower link arm 40c is connected thereto by a link pin 40c1. The upper link arm 40b is fastened to the cylinder block 14a by another link pin 40b2.

Another link pin 40c2 of the lower link arm 40c is connected to a movable shaft (control shaft; not shown) lying parallel to the crankshaft 30. The movable shaft is connected to an electric motor 40d through reduction gearing (not shown). Rotation of the movable shaft by the motor 40d via the reduction gearing moves the center of rotation where the line connecting link pins 40b1, 40b2 of the upper link arm 40b and the line connecting the link pins 40c1, 40c2 of the lower link arm 40c intersect, thereby changing the distance between the intake cam 50a and rocker arm 40a to change or regulate the amount of lift of the intake valve 20.

The variable phase mechanism 42 will be explained next. The variable phase mechanism 42 is connected to the intake camshaft 50.

Figure 3:
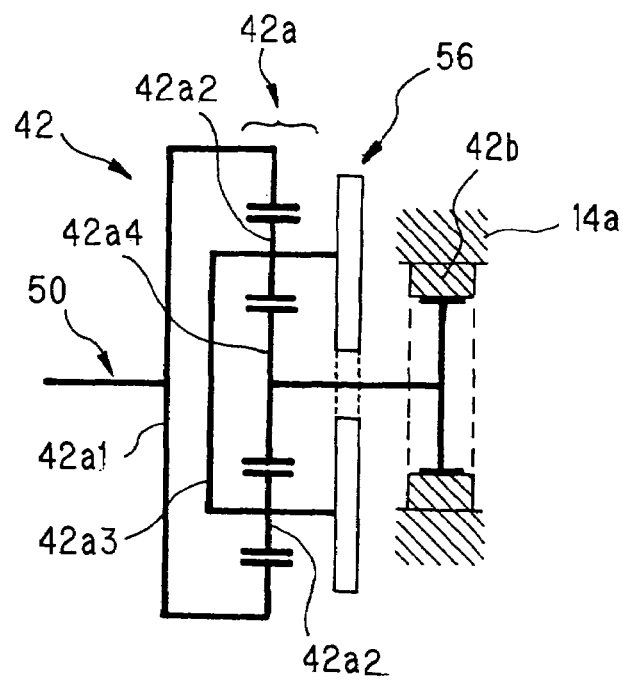
FIG. 3 is a side view showing a variable phase mechanism shown in FIG. 1.
Figure 4:
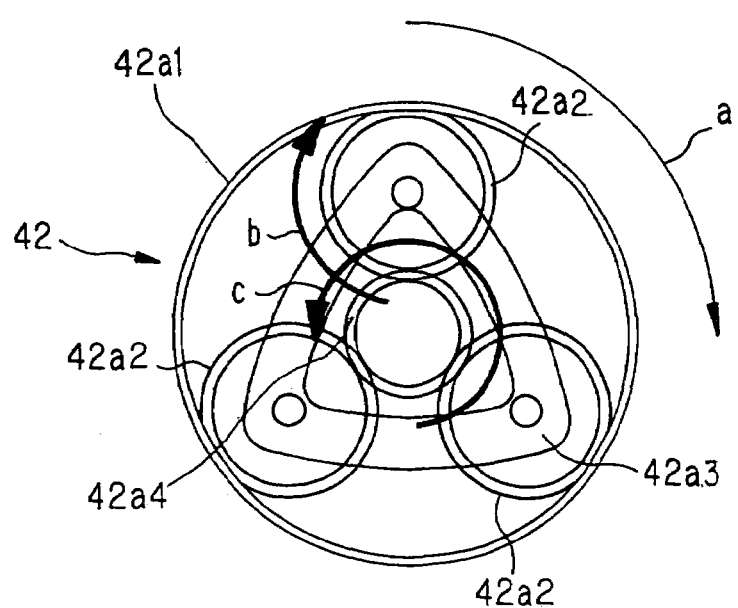
FIG. 4 is a front view showing the variable phase mechanism shown in FIG. 3.

The variable phase mechanism 42 is shown schematically in FIG. 3. A front view of the mechanism is shown in FIG. 4. The structure of an electromagnetic brake thereof is shown schematically in FIG. 5.

The variable phase mechanism 42 is equipped with a planetary gear system 42a and an electromagnetic brake 42b fastened to the cylinder block 14a. A ring gear 42a1 of the of the planetary gear system 42a is fastened to the intake camshaft 50. Three planetary pinions 42a2 mesh with the ring gear 42a1 at intervals of 120 degrees.

As best shown in FIG. 4, the three planetary pinions 42a2 are interconnected by a carrier 42a3 having the shape of an equilateral regular triangle in plan view and, as shown in FIG. 3, are connected through the carrier 42a3 to a sprocket 56 that is driven by the crankshaft 30. The carrier 42a3 is connected through a connector 42b1 of the electromagnetic brake 42b shown in FIG. 5 to one end of a return spring (compression spring) 42b2.

A sun gear 42a4 meshes with the three planetary pinions 42a2. The sun gear 42a4 is fastened to a connector 42b3 of the electromagnetic brake 42b shown in FIG. 5 and through the connector 42b3 to the other end of the return spring 42b2.

Figure 5:
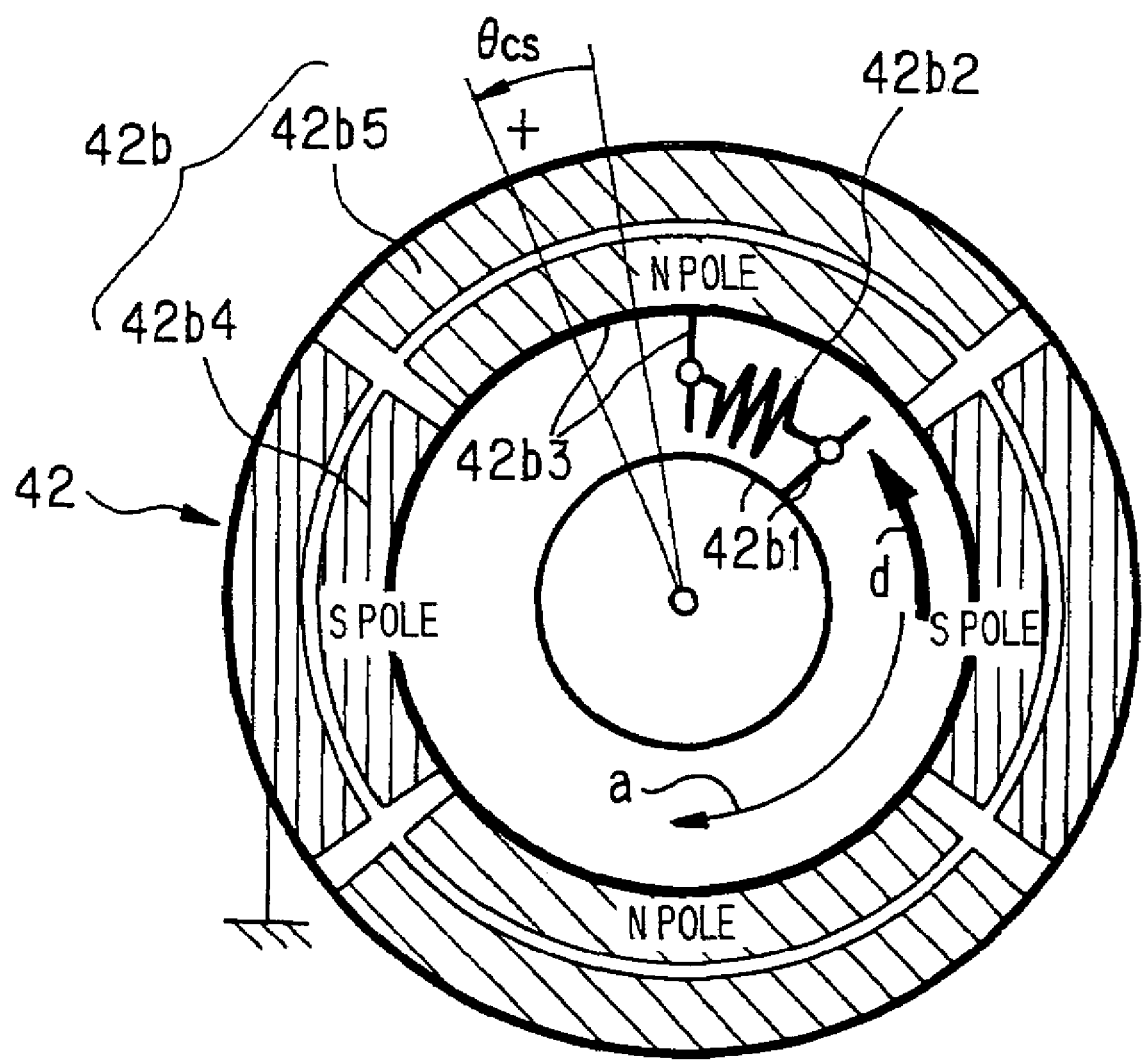
FIG. 5 is a front view showing the structure of an electromagnetic brake in the variable phase mechanism shown in FIG. 3.

As shown in FIG. 5, the electromagnetic brake 42b includes an annular permanent magnet 42b4 located on the outer periphery of the annular connector 42b3 to which the sun gear 42a4 is connected and an annular electromagnet 42b5 located on the outer periphery of the permanent magnet 42b4. The permanent magnet 42b4 has a bipolar structure composed of four magnetic pole pieces arranged with alternating north-south polarities.

The electromagnet 42b5 is composed of four conductors, i.e., laminated steel plates arranged in one-to-one correspondence with the four magnetic pole pieces. The conductors are wound with coils (not shown) that are applied with energizing current by an energizing circuit (not shown) to be magnetized in a polarity depending on the energization direction. Thus the electromagnetic brake 42b resembles a DC motor in structure.

The return spring 42b2 operates through the connectors 42b1, 42b3 to bias the sun gear 42a4 clockwise relative to the carrier 42a3 as viewed in FIG. 5. That is, the sun gear 42a4 is biased in the retard direction, specifically in the direction of retarding the opening (and closing) of the intake valves 20 relative to the rotation of the crankshaft 30.

In the variable phase mechanism 42 of the illustrated structure, the sprocket 56 is rotated one-half turn in the direction of the arrow a in FIG. 4 with rotation of the crankshaft 30. The rotation of the sprocket 56 is transmitted through the carrier 42a3 to the planetary pinions 42a2 to rotate them in the direction of the arrow b. As a result, the ring bear 42a1 and the intake camshaft 50 are rotated in the same direction as the direction of rotation of the sprocket 56 (direction of arrow a) and the sun gear 42a4 is rotated in the direction indicated by the arrow c in FIG. 4.

If at this time the electromagnet 42b5 is energized to brake the rotation of the permanent magnet 42b4 connected to the sun gear 42a4 through the connector 42b3, the intake camshaft 50 will be moved relative to the sprocket 56 in the retard direction indicated by the arrow d in FIG. 5 by an amount proportional to the braking force, thereby moving ahead or angularly advancing the contact point between the intake cam 50a and rocker arm 40a relative to the crank angle.

Therefore, when the sun gear 42a4 has rotated relatively by a certain angle to bring the braking force and the return spring force into equilibrium, the planetary pinions 42a2 stop operating, so that the sprocket 56 and intake camshaft 50 rotate unitarily while maintaining the certain angle therebetween. In other words, the cam phase is controlled in the advance and retard directions by increasing and decreasing the braking force. The phase, i.e., timing of valve opening and closing of the exhaust valves 32 is variably regulated (controlled) similarly by a variable phase mechanism connected to the exhaust camshaft 52. Since the structure of this variable phase mechanism is basically the same as the variable phase mechanism 42, a detailed description will be omitted.

The variable compression ratio mechanism 44 will now be explained. As shown in FIG. 2, a first link 44b of substantially triangular shape in plan view is connected to a connecting rod 26a of the piston 26 by a link pin 44a.

The first link 44b is formed at a location eccentric or radially offset from the link pin 44a with a hole 44b1 for rotatably accommodating the crankshaft 30 and one end thereof is connected to a second link 44c by a link pin 44b2. A smaller-diameter link pin 44c1 provided at the tip of the second link 44c is eccentrically connected to a larger-diameter movable shaft (control shaft) 44c2 formed at the tip of a third link 44d fastened to the cylinder block 14a.

The movable shaft 44c2 is driven to rotate by a hydraulic mechanism 44e, thereby at each cylinder operating the four-joint linkage composed of the first link 44b, second link 44c and third link 44d so as to change the TDC (top dead center; and BDC bottom dead center) of the pistons 26 to variably regulate or control the compression ratio of the combustion chambers 22.

The explanation of FIG. 1 will be resumed. A crank angle sensor 60 installed near the crankshaft 30 outputs a cylinder discrimination signal for indicating the crankangle positions at the four cylinders 14, a TDC signal indicative of a position related to the TDC of the four pistons 26, and signals indicative of unit crank angles, for example, crank angle signals (CRK signals) produced every 15 degrees of crankshaft rotation.

A camshaft sensor 62 installed near the intake camshaft 50 (shown in FIG. 2) produces an output or signal every predetermined angle of rotation, e.g., one every one degree of rotation, of the intake camshaft 50. A lift sensor 64 constituted as rotary encoder or the like and installed near the reduction gearing of the motor 40d in the variable lift mechanism 40 produces an output or signal corresponding to the amount of lift or amount of valve opening Liftin of the intake valves 20 owing to the geared-down rotation of the motor 40d. A compression ratio sensor 66 installed near the hydraulic mechanism 44e in the variable compression ratio mechanism 44 uses the detected the stroke or amount of rotation of the hydraulic mechanism 44e to produce an output corresponding to the compression ratio Cr of the combustion chambers 22.

An airflow meter (AFM) 68 installed near the end of the air intake pipe 12 produces an output or signal corresponding to the intake air quantity Q. A water temperature sensor 70 installed near a coolant channel (not shown) of the cylinder 14 produces an output or signal indicative of the coolant temperature TW of the engine 10.

An accelerator position sensor 74 installed near the accelerator pedal (not shown) provided on the floor near the driver's seat of the vehicle (not shown) in which the engine 10 is mounted produces an output or signal corresponding to the accelerator opening or depression amount AP produced by the driver's depression of the accelerator pedal.

The outputs of the forgoing sensors are sent to an ECU (Electronic Control Unit) 80. As shown in the drawing, the ECU 80 is a microcomputer comprising a CPU 80a, memory 80b, input interface 80c and output interface 80d, and also including an A/D converter circuit, waveforming circuit, counter and other components that are not shown in the drawing.

The outputs of some sensors, including the crank angle sensor 60, are waveformed by the waveforming circuit, while the outputs of others, including the airflow meter (AFM) 68, are converted to digital values by the A/D converter circuit. The ECU 80 detects or determines the engine speed NE by using the counter to count the CRK signals output by the crank angle sensor 60. In addition, it detects or determines the cam phase Cain (timing of the opening and closing of the intake valves 20) based on the CRK signals and the output of the camshaft sensor 62.

As will be explained further later, based on the detected values and other sensor outputs, the ECU 80 executes an exhaust gas temperature control to control the temperature of the exhaust system, more specifically the temperature of the first and second catalytic converters 36 and 38, and at the same time, executes other controls to control the variable phase mechanism 42 and other variable mechanisms of the engine 10, as well as its fuel injection quantity and ignition timing.

Figure 6:
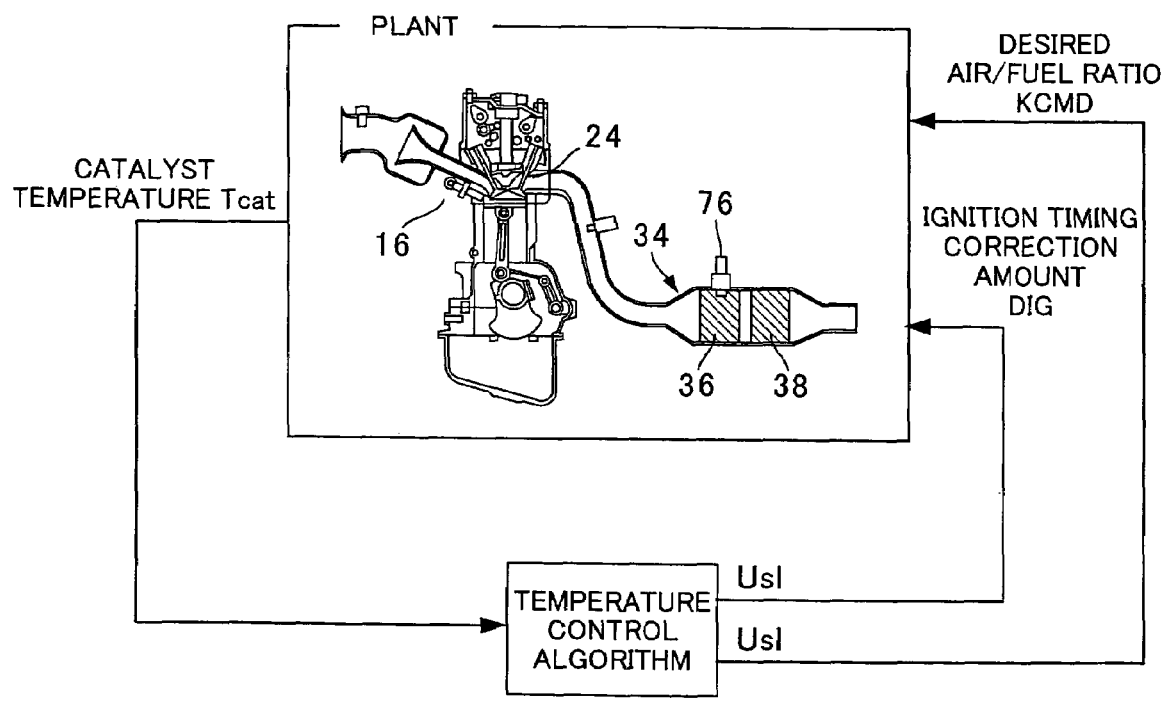
FIG. 6 is a block diagram showing exhaust gas temperature control that is executed by an ECU shown in FIG. 1.

FIG. 6 is a block diagram illustrating exhaust gas temperature control that is one type of control executed by the ECU 80. Explanation will be made with reference to this drawing after first clarifying the problem to be solved by the invention.

As mentioned above, commercially available temperature sensors, particularly those suitable for mounting in an vehicle (like the temperature sensor 76 appearing in FIG. 1), are subject to durability, heatproof temperature and other requirements that make them very poor in response. Accurate control of actual plant temperature with a lively response is therefore difficult to achieve with such a temperature sensor.

Therefore, when using a temperature sensor that is poor in response like the temperature sensor 76, compensation by a control algorithm is required. As shown in the example of FIG. 6, it is conceivable to adopt a configuration which calculates a control input Usl directly from the temperature sensor output Tcat by simplified two-degree-of-freedom sliding mode control in accordance with Equations 1-1 to 1-6 set out below and determines an ignition timing correction amount DIG and a desired air/fuel ratio KCMD by retrieving the characteristic curves or tables shown in FIG. 7 by the calculated control input Usl (i.e., to convert the control input Usl into the ignition timing correction amount DIG and the desired air-fuel fuel ratio KCMD).

Specifically, it is conceived such that, the temperature sensor 76 is attached to the NOx catalytic converter 36 of the exhaust system of the engine 10, the temperature sensor 76 detects the temperature Tcat of the NOx catalytic converter 36, and the ignition timing and/or the air/fuel ratio is manipulated to control Tcat to a predetermined desired temperature Tcat_cmd.

$$Usl(k) = Urch(k) + Uadp(k) \quad (1\text{-}1)$$

$$Urch(k) = -Krch\,\sigma(k) \quad (1\text{-}2)$$

$$Uadp(k) = -Kadp \sum_{i=0}^{k} \sigma(i) \quad (1\text{-}3)$$

$$\sigma(k) = Etcat(k) + S\,Etcat(k-1) \quad (1\text{-}4)$$

$$Etcat(k) = Tcat(k) - \text{Tcat\_cmd\_f}(k-1) \quad (1\text{-}5)$$

$$\text{Tcat\_cmd\_f}(k) = -R\,\text{Tcat\_cmd\_f}(k-1) + (1+R)\text{Tcat\_cmd}(k) \quad (1\text{-}6)$$

Krch, Kadp: Feedback gains

S: Switching function parameter

R: Desired value filter coefficient Here: $-1<R<S<0$

The multiplication signs are omitted in Equation 1 and elsewhere.

The simplified two-degree-of-freedom sliding mode control will be briefly explained. Two-degree-of-freedom sliding mode control is an extension of sliding control (response-directive control enabling designation of the controlled variable convergence rate) that permits the tracking rate with respect to a desired value of the controlled variable and a convergence rate of the controlled variable when disturbance is applied to be individually designated. The sliding mode control used in this embodiment is a simplified version of this sliding control.

More specifically, the algorithm of the simplified two-degree-of-freedom sliding mode control first calculates the filtered value of the desired value (desired filter) Tcat_cmd_f (k) in accordance with the first-order lag filter algorithm represented by Equation 1-6. R in this equation is the desired value filter coefficient and S is the switching function parameter used in Equation 1-6 among others. R and S are defined to fall between −1 and 0 as shown following Equation 1-6. The symbol k represents a sampling number (time) of the discrete-time system (both here and in the following description).

Next, the control input Usl(k) is calculated in accordance with the sliding mode control algorithms represented by Equations 1-1 to 1-5. The control input Usl(k) is calculated as the sum of the reaching rule input Urch(k) and the adaptability rule input Uadp(k). The reaching rule input Urch(k), which is an input for placing the quantity of state on the switching line, is calculated in accordance with Equation 1-2. Krch in this equation is a predetermined reaching rule gain (feedback gain) and σ(k) is a switching function defined in the manner of Equation 1-4 and Etcat(k) in Equation 1-5 is a tracking error calculated in accordance with Equation 1-5. The adaptability rule input Uadp(k) is an input for placing the quantity of state on the switching line while suppressing steady-state error, and is calculated as the integral term of the switching function σ using the adaptability gain Kadp (feedback gain), in accordance with Equation 1-3.

In accordance with the foregoing two-degree-of-freedom sliding mode control algorithm, the temperature Tcat of the first and second catalytic converters 36 and 38 can be made to track the desired temperature Tcat_cmd with high accuracy while suppressing disturbance. Particulars regarding the two-degree-of-freedom sliding mode control are set out in the assignee's Japanese Patent Application No. 2003-173934 and will not be repeated here.

Figure 8:
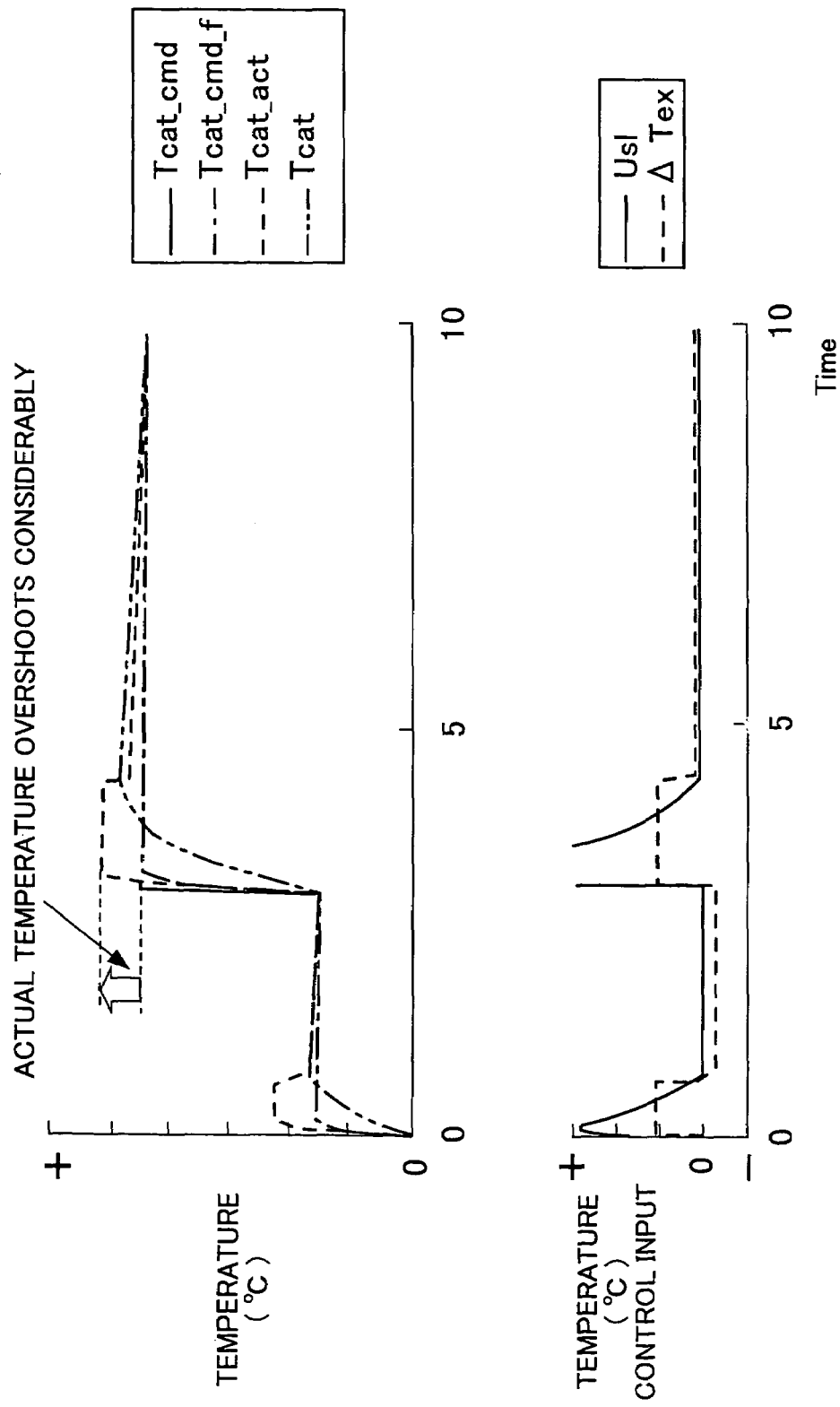
FIG. 8 is a set of graphs showing simulation results in the case of using the configuration shown in FIG. 6.

FIG. 8 is a graph showing simulation results for the configuration shown in FIG. 6.

In the configuration shown in FIG. 6, the fluctuation amplitude ΔTex of the temperature Tex of the exhaust gas actually discharged from the port is limited, so that when an attempt is made to converge Tcat, which has a large response delay, on the desired temperature Tcat_cmd, the actual catalyst temperature Tcat_act overshoots considerably as shown in FIG. 8. Moreover, the sensor output Tcat also overshoots, so that time required for convergence on Tcat_cmd is made very long. It is noted that the "actual catalyst temperature Tcat_act" referred to here means the true value obtained using a special experimental instrument for the temperature measurement (the same hereinafter).

Figure 9:
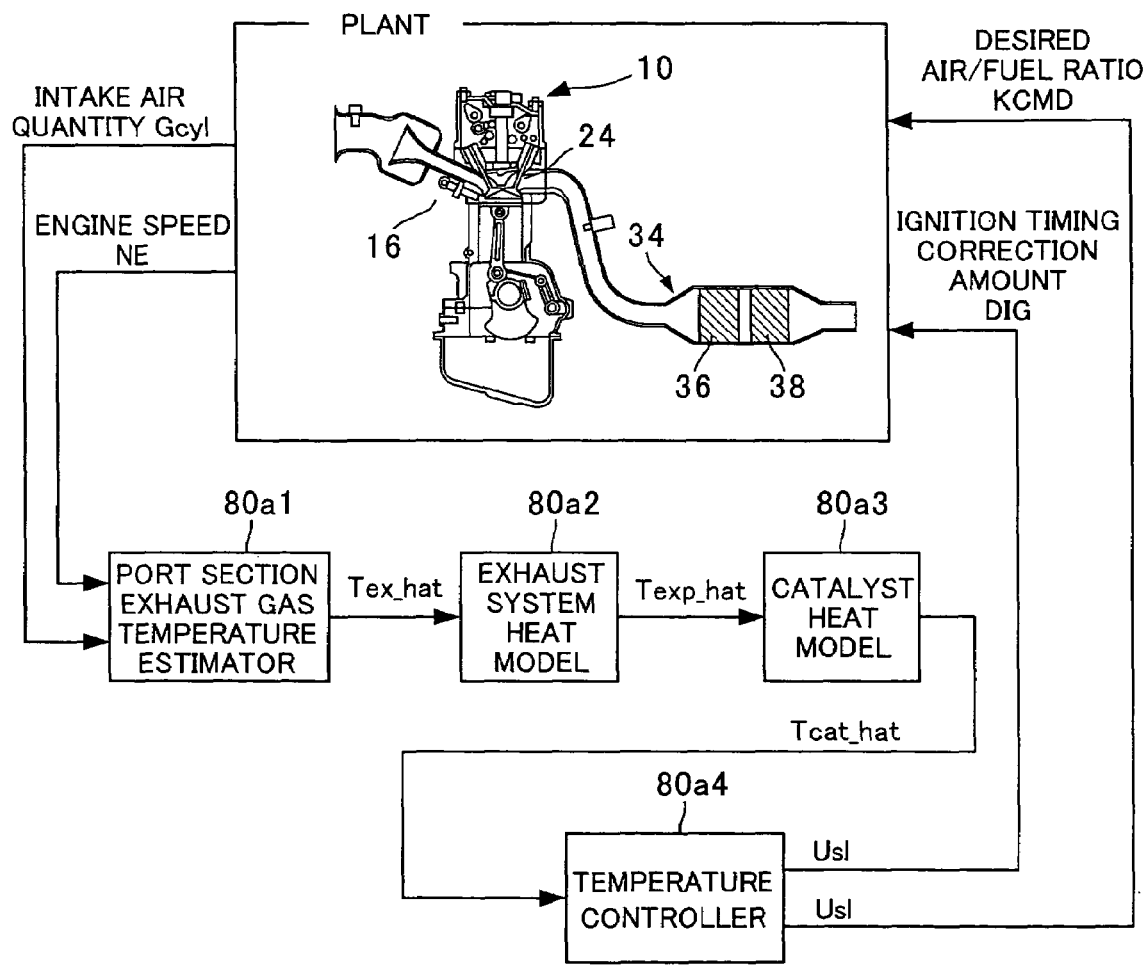
FIG. 9 is a block diagram showing another example of the exhaust gas temperature control that is executed by the ECU shown in FIG. 1.

FIG. 9 is a block diagram showing a configuration that might be considered in light of the foregoing inconvenience caused by the large response delay of the temperature sensor 76. The system of this configuration, which does not use the temperature sensor 76, is equipped with a port section exhaust gas temperature estimator 80a1, exhaust system heat model 80a2, catalyst heat model 80a3, and temperature controller 80a4. The port section exhaust gas temperature estimator 80a1 calculates the port section exhaust gas temperature estimated value Tex_hat from the load (intake air quantity) Gcyl and speed NE of the engine 10. The estimated value Tcat_hat of the temperature Tcat of the first and second catalytic converters 36 and 38 (more exactly, the first catalytic converter 36) is estimated based on the exhaust system heat model 80a2 and the catalyst heat model 80a3, and the temperature controller 80a4 controls the temperature estimated value Tcat_hat to the desired value.

Figure 10A:
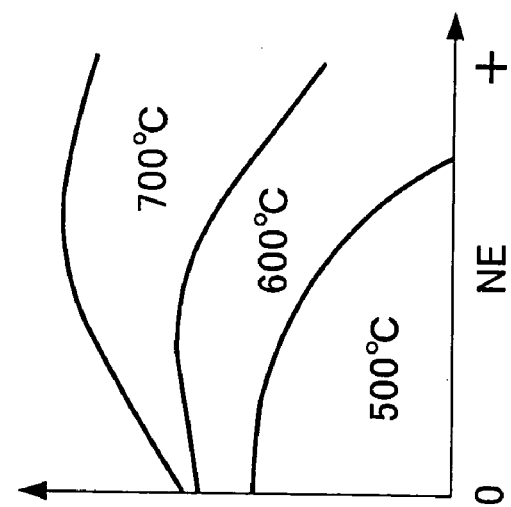
FIG. 10A to 10C are a set of graphs showing the characteristics of an exhaust gas temperature base value Tex_base of a port section exhaust gas temperature estimated value Tex_hat, which is used in the configuration shown in FIG. 9.
Figure 10B:
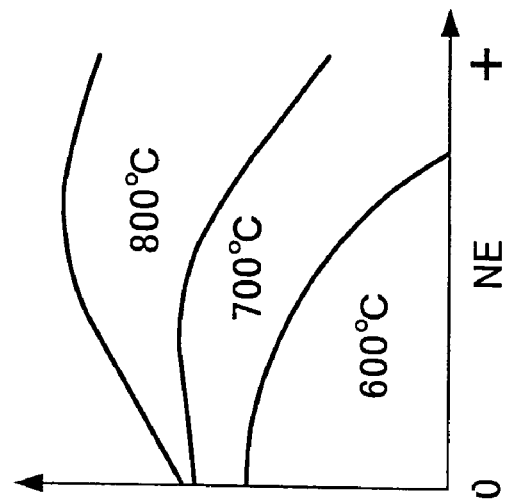
Figure 10C:
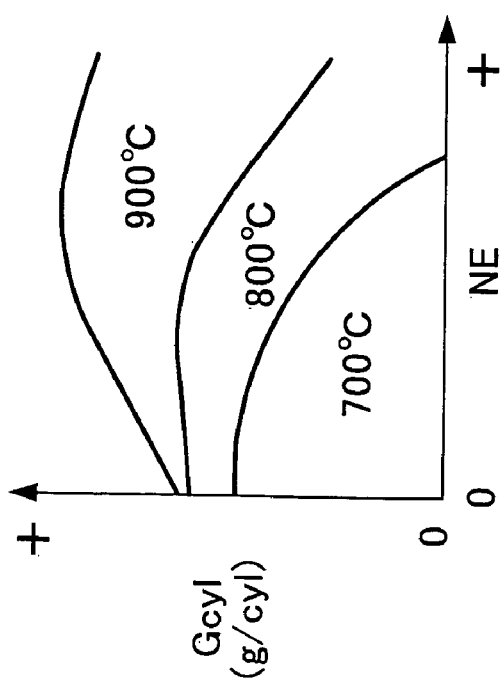

In the configuration shown in FIG. 9, the port section exhaust gas temperature estimator 80a1 estimates the port section exhaust gas temperature estimated value Tex_hat from the exhaust gas temperature base value Tex_base and air/fuel ratio temperature correction coefficient Kaf_tex whose characteristic curves are shown in FIGS. 10 and 11 as follows. In FIG. 10, the exhaust temperature base value is set in the range of 500° C. to 900° C.

$$\text{Tex\_hat}(k) = \text{Tex\_base}(k)\,\text{Kaf\_tex}(k) \quad (1\text{-}7)$$

where

Tex_base: Value determined from the characteristic curve of FIG. 10 for current Gcyl and NE Kaf_tex: Value determined from the characteristic curve of FIG. 11 for current air/fuel ratio (desired air-fuel fuel ratio KCMD or detected value KACT)

The exhaust system heat model 80a2 and catalyst heat model 80a3 are implemented by the following equations and the exhaust gas temperature estimated value Texp_hat and the catalytic converter temperature estimated value Tcat_hat are estimated using these models.

$$\frac{T\text{exp\_hat}(k) - T\text{exp\_hat}(k-1)}{\Delta T} = \qquad (1\text{-}8)$$
$$A\text{exp}(T\text{exp\_hat}(k-1) - TA(k-1)) -$$
$$\frac{B\text{exp}\,Gcyl(k-1)}{L\text{exp}\,Gcyl\_max}(T\text{ex\_hat}(k-1) - T\text{exp\_hat}(k-1))$$
$$\Downarrow$$

$$T\text{exp\_hat}(k) = \qquad (1\text{-}9)$$
$$\left(A\text{exp}\,\Delta T + 1 + \frac{B\text{exp}\,Gcyl(k-1)\Delta T}{L\text{exp}\,Gcyl\_max}\right)T\text{exp\_hat}(k-1) -$$
$$\frac{B\text{exp}\,Gcyl(k-1)}{L\text{exp}\,Gcyl\_max}T\text{ex\_hat}(k-1)\Delta T - A\text{exp}\,TA(k-1)\Delta T$$

where

Aexp, Bexp: Heat model parameters

TA( ): Atmospheric temperature

Gcyl_max: Engine maximum intake air quantity

Lexp: Exhaust system length $$\frac{T\text{cat\_hat}(k) - T\text{cat\_hat}(k-1)}{\Delta T} = \qquad (1\text{-}10)$$
$$A\text{cat}(T\text{cat\_hat}(k-1) - TA(k-1)) - \frac{B\text{cat}\,Gcyl(k-1)}{L\text{cat}\,Gcyl\_max}$$
$$(T\text{exp\_hat}(k-1) - T\text{cat\_hat}(k-1)) + C\text{cat}\,Gcyl(k-1)$$
$$\Downarrow \qquad (1\text{-}11)$$

$$T\text{cat\_hat}(k) =$$
$$\left(A\text{cat}\,\Delta T + 1 + \frac{B\text{cat}\,Gcyl(k-1)\Delta T}{L\text{cat}\,Gcyl\_max}\right)T\text{cat\_hat}(k-1) -$$
$$\frac{B\text{cat}\,Gcyl(k-1)}{L\text{cat}\,Gcyl\_max}T\text{exp\_hat}(k-1)\Delta T -$$
$$A\text{cat}\,TA(k-1)\Delta T + C\text{cat}\,Gcyl(k-1)\Delta T$$

where

Acat, Bcat, Ccat: Heat model parameters

Lcat: Catalyst length

The reason for using the air/fuel ratio temperature correction coefficient Kaf_tex and defining its characteristic curve as shown in FIG. 11 is that the exhaust gas temperature Tex falls during lean air/fuel ratio operation owing to increase in excess air and also falls during rich air/fuel ratio operation owing to the cooling effect of the latent heat of evaporation of excess fuel. Also worth noting is that in Equations 1-8 and 1-11, the heat model parameters can be varied in accordance with the operating conditions of the engine 10, such as the engine speed NE, the load (intake air quantity) Gcyl (which is also true for Equations 2-4 and 2-5 and other equations discussed later).

Figure 7:
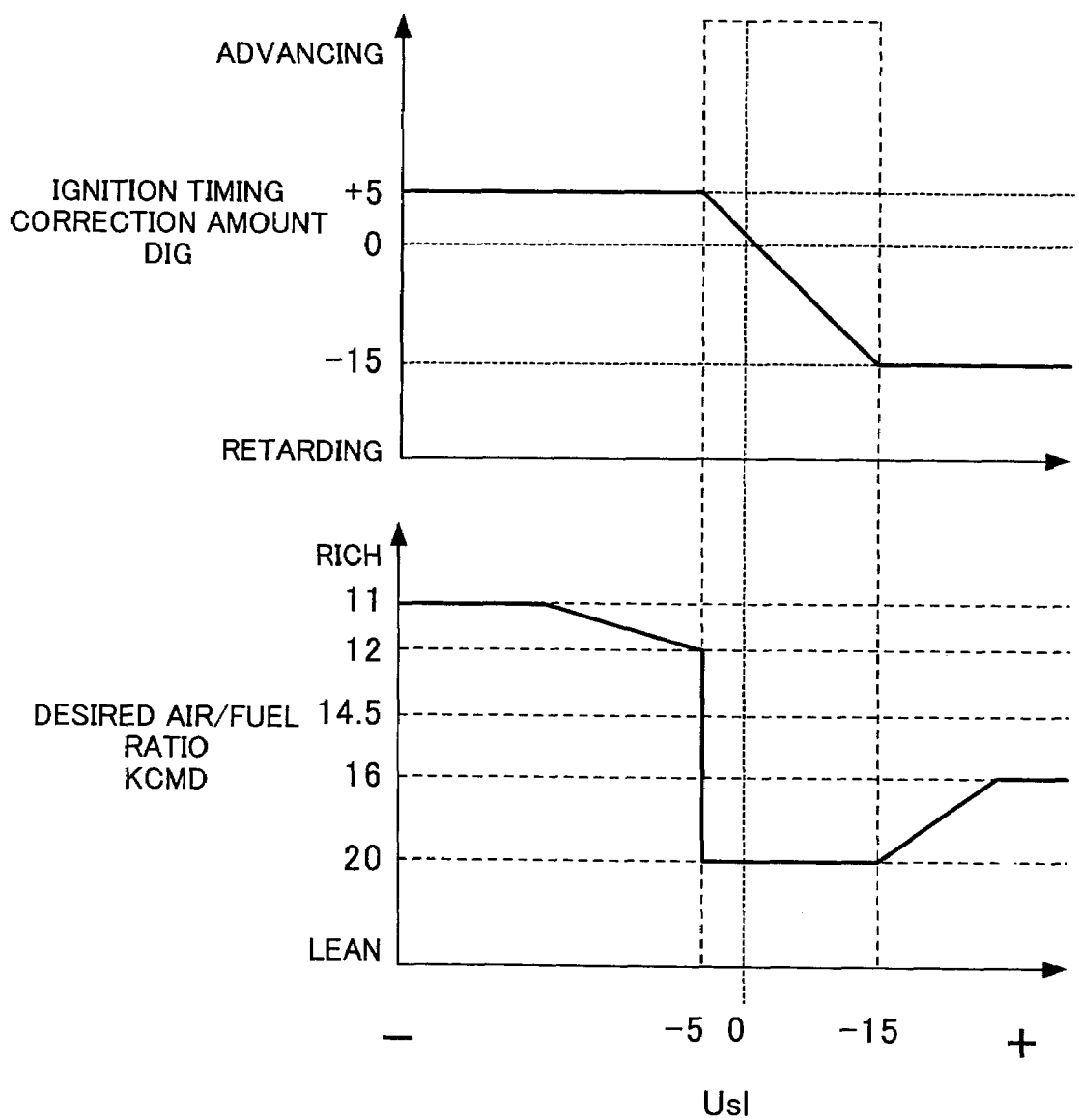
FIG. 7 is a graph showing the characteristics of an ignition timing correction amount DIG and a desired air/fuel ratio KCMD with respect to a control input Usl, which are used in the configuration shown in FIG. 6.

In the configuration shown in FIG. 9, the temperature controller 80a4 can, as per the following equation, similarly be represented as utilizing simplified two-degree-of-freedom sliding mode control.

$$DIG(k) \leftarrow \text{By conversion of } USl(k) \text{ from FIG. 7} \qquad (1\text{-}13)$$

$$KCMD(k) \leftarrow \text{By conversion of } Usl(k) \text{ from FIG. 7} \qquad (1\text{-}14)$$

-continued $$Usl(k) = Urch(k) + Uadp(k) \qquad (1\text{-}15)$$

$$Urch(k) = -Krch\,\sigma(k) \qquad (1\text{-}16)$$

$$Uadp(k) = -Kadp\sum_{i=0}^{k}\sigma(i) \qquad (1\text{-}17)$$

$$\sigma(k) = Etcat(k) + S\,Etcat(k-1) \qquad (1\text{-}18)$$

$$Etcat(k) = T\text{cat\_hat}(k) - T\text{cat\_cmd\_f}(k) \qquad (1\text{-}19)$$

$$T\text{cat\_cmd\_f}(k) = -R\,T\text{cat\_cmd\_f}(k-1) + (1+R)T\text{cat\_cmd}(k) \qquad (1\text{-}20)$$

where

Krch, Kadp: Feedback gains

S: Switching function parameter

R: Desired value filter coefficient Here, −1<R<S<0

Figure 12:
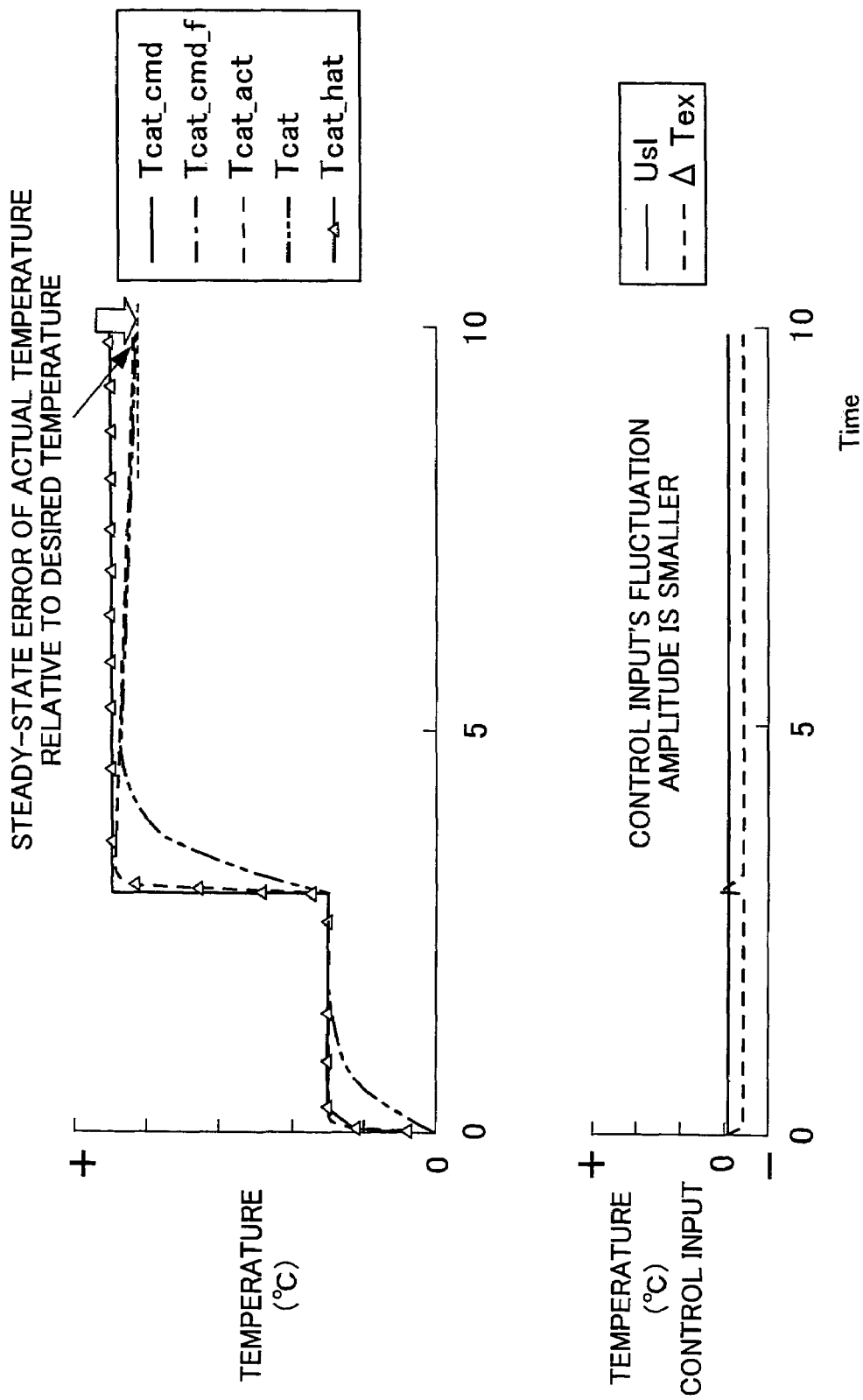
FIG. 12 is a set of graphs showing simulation results in the case of using the configuration shown in FIG. 9.

The simulation results in the case of using the configuration of FIG. 9 are shown in FIG. 12.

As is clear from FIG. 12, owing to the determination of the control input based on the temperature estimated value Tcat_hat, the actual catalyst temperature Tcat_act does not greatly overshoot the desired temperature Tcat_cmd as it does in the case of the configuration using the sensor output Tcat. Further, the fluctuation amplitude of the control input Usl is made much smaller, so that control is conducted without carrying out needless ignition timing correction or air/fuel ratio modification.

Because the control uses an estimated value, however, error is liable to occur between the actual system and the model owing to unit-to-unit variation and aging of the engine 10 and first and second catalytic converters 36 and 38, and also because of changes in operating conditions, environmental conditions and the like. As shown in FIG. 12, this leads to the occurrence of steady-state error between the actual catalyst temperature Tcat_act and the desired temperature Tcat_cmd. The configuration of FIG. 6 using the sensor output value is therefore superior in this regard.

Figure 13:
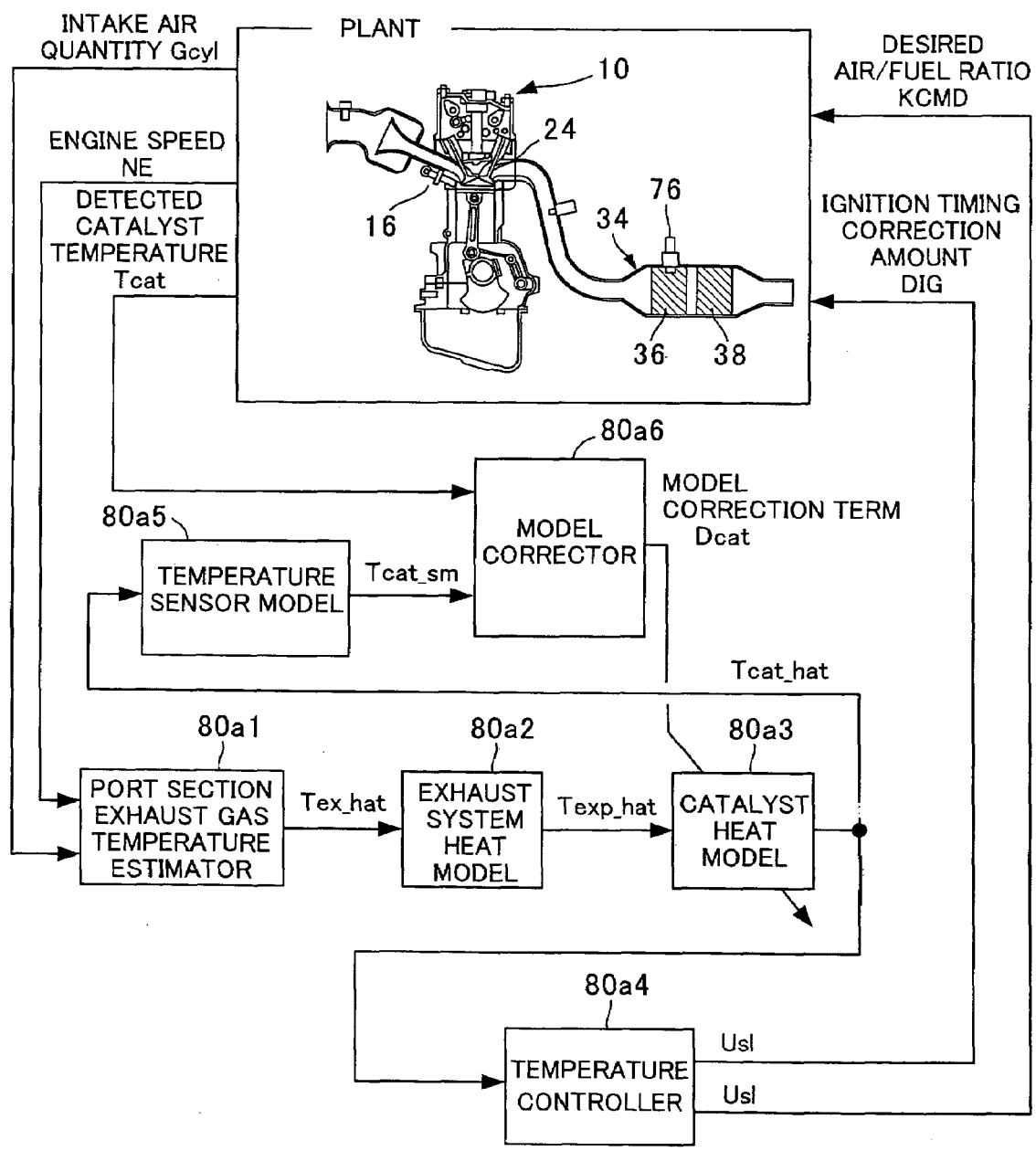
FIG. 13 is a block diagram showing the structure of the plant temperature control system according to the first embodiment.

In light of the foregoing circumstances, the plant temperature control system according to this embodiment is configured as shown in FIG. 13 to comprise the temperature sensor 76, the port section exhaust gas temperature estimator 80a1, the exhaust system heat model 80a2, the catalyst heat model 80a3, the temperature controller 80a4, a temperature sensor model 80a5, and a model corrector 80a6. In this arrangement, the overshoot of the actual catalyst temperature Tcat_act relative to the desired temperature Tcat_cmd and the variation of the control input are minimized in the course of compensating the steady-state error between the actual catalyst temperature Tcat_act and the desired temperature Tcat_cmd. The control system shown in FIG. 13 is designed to retain the merits of the configurations of both FIG. 6 and FIG. 9 while eliminating their defects.

In the configuration shown in FIG. 13, the temperature sensor model 80a5, which is obtained by newly modeling the response delay of the temperature sensor 76, is added to the catalyst temperature Tcat estimation algorithm shown in FIG. 9 to calculate the estimated value Tcat_sm of the temperature sensor output. In addition, the model corrector 80*a*6 corrects the (model) parameter (model correction term) Dcat of the catalyst heat model 80*a*3 so as to minimize the error between the output estimated value Tcat_sm and the temperature sensor output (also designated Tcat). Further, the temperature controller 80*a*4 determines the control input Usl (desired air/fuel ratio KCMD and ignition timing correction amount DIG) based on the temperature estimated value Tcat_hat estimated by the catalyst heat model 80*a*3.

In the configuration shown in FIG. 13, the port section exhaust gas temperature estimator 80*a*1 is, like in the configuration of FIG. 9, implemented as follows.

$$\text{Tex\_hat}(k) = \text{Tex\_base}(k)\text{Kaf\_tex}(k) \quad (2\text{-}1)$$

where

Tex_base: Value determined from the characteristic curve of FIG. 10 for current Gcyl and Ne Kaf_tex: Value determined from the characteristic curve of FIG. 11 for current air/fuel ratio (desired air-fuel fuel ratio KCMD or detected value KACT)

The exhaust system heat model 80*a*2 is, also like in the configuration of FIG. 9, implemented as follows.

$$\frac{T\exp\_hat(k) - T\exp\_hat(k-1)}{\Delta T} = \quad (2\text{-}2)$$
$$A\exp(T\exp\_hat(k-1) - TA(k-1)) -$$
$$\frac{B\exp G cyl(k-1)}{L\exp G cyl\_max}(Tex\_hat(k-1) - T\exp\_hat(k-1))$$

$$\Downarrow \quad (2\text{-}3)$$

$$T\exp\_hat(k) =$$
$$\left(A\exp \Delta T + 1 + \frac{B\exp Gcyl(k-1)\Delta T}{L\exp Gcyl\_max}\right)T\exp\_hat(k-1) -$$
$$\frac{B\exp Gcyl(k-1)}{L\exp Gcyl\_max}Tex\_hat(k-1)\Delta T - A\exp TA(k-1)\Delta T$$

where

Aexp, Bexp: Heat model parameters

TA( ): Atmospheric temperature

Gcyl_max: Engine maximum intake air quantity

Lexp: Exhaust system length

ΔT: Sampling/control cycle

The catalyst heat model 80*a*3 is implemented by the following equations obtained by adding the correction term Dcat calculated by the model corrector 80*a*6.

$$\frac{Tcat\_hat(k) - Tcat\_hat(k-1)}{\Delta T} = Acat(Tcat\_hat(k-1) - TA(k-1)) - \quad (2\text{-}4)$$
$$\frac{Bcat Gcyl(k-1)}{Lcat Gcyl\_max}(Texp\_hat(k-1) - Tcat\_hat(k-1)) +$$
$$Ccat Gcyl(k-1) + Dcat(k-1)$$

$$\Downarrow \quad (2\text{-}5)$$

$$Tcat\_hat(k) = \left(Acat \Delta T + 1 + \frac{Bcat Gcyl(k-1)\Delta T}{Lcat Gcyl\_max}\right)Tcat\_hat(k-1) -$$
$$\frac{Bcat Gcyl(k-1)}{Lcat Gcyl\_max}Texp\_hat(k-1)\Delta T -$$
$$Acat TA(k-1)\Delta T + Ccat Gcyl(k-1)\Delta T + Dcat(k-1)\Delta T$$

where

Acat, Bcat, Ccat: Heat model parameters

TA( ): Atmospheric temperature

Lcat: Catalyst length

The correction term Dcat is a term for correcting the errors of the exhaust system heat model 80*a*2 and catalyst heat model 80*a*3 heat dissipation terms (first term on the right side), heat inflow term (second term on the right side), and the catalyst heat model 80*a*3 catalyst heat generation term (third term on the right side).

Since the temperature sensor 76 can be viewed as a first-order lag system having a large delay, the temperature sensor model 80*a*5 can be modeled by the following equation.

$$Tcat\_sm(k) = (1+Ksm)Tcat\_sm(k-1) - KsmTcat\_hat(k) \quad (2\text{-}6)$$

where

Ksm: Sensor delay coefficient (−1<Ksm<0)

The model corrector 80*a*6 minimizes the error Eest between the output estimated value Tcat_sm and temperature sensor output Tcat, specifically the second-order error of the error Eest. It is implemented by the following algorithm (fixed gain method).

$$Dcat(k) = Dcat(k-1) + \frac{Pest}{1 + Pest}Eest(k) \quad (2\text{-}7)$$

$$Eest(k) = Tcat\_sm(k) - Tcat(k) \quad (2\text{-}8)$$

where

Pest: Correction gain (Pest>0)

The computing equations used by the temperature control controller 80*a*4 are substantially the same as those used in the configuration of FIG. 9 and are represented as shown below.

$$DIG(k) \leftarrow \text{By conversion of } Usl(k) \text{ from FIG. 7} \quad (2\text{-}9)$$

$$KCMD(k) \leftarrow \text{By conversion of } Usl(k) \text{ from FIG. 7} \quad (2\text{-}10)$$

$$Usl(k) = Urch(k) + Uadp(k) \quad (2\text{-}11)$$

$$Urch(k) = -Krch\,\sigma(k) \quad (2\text{-}12)$$

$$Uadp(k) = -Kadp\sum_{i=0}^{k}\sigma(i) \quad (2\text{-}13)$$

$$\sigma(k) = Etcat(k) + S\,Etcat(k-1) \quad (2\text{-}14)$$

$$Etcat(k) = Tcat\_hat(k) - Tcat\_cmd\_f(k) \quad (2\text{-}15)$$

$$Tcat\_cmd\_f(k) = -R\,Tcat\_cmd\_f(k-1) + (1+R)Tcat\_cmd(k) \quad (2\text{-}16)$$

where

Krch, Kadp: Feedback gains

S: Switching function parameter

R: Desired value filter coefficient Here, −1<R<0

The temperature estimated value Tcat_hat used by the temperature controller 80*a*4 is calculated by Equation 2-5 using correction term Dcat (k−1), but it is also possible to make a new equation using Dcat(k) in place of Dcat(k−1) and use the temperature estimated value Tcat_hat calculated by the new equation for calculating the control input.

Figure 14:
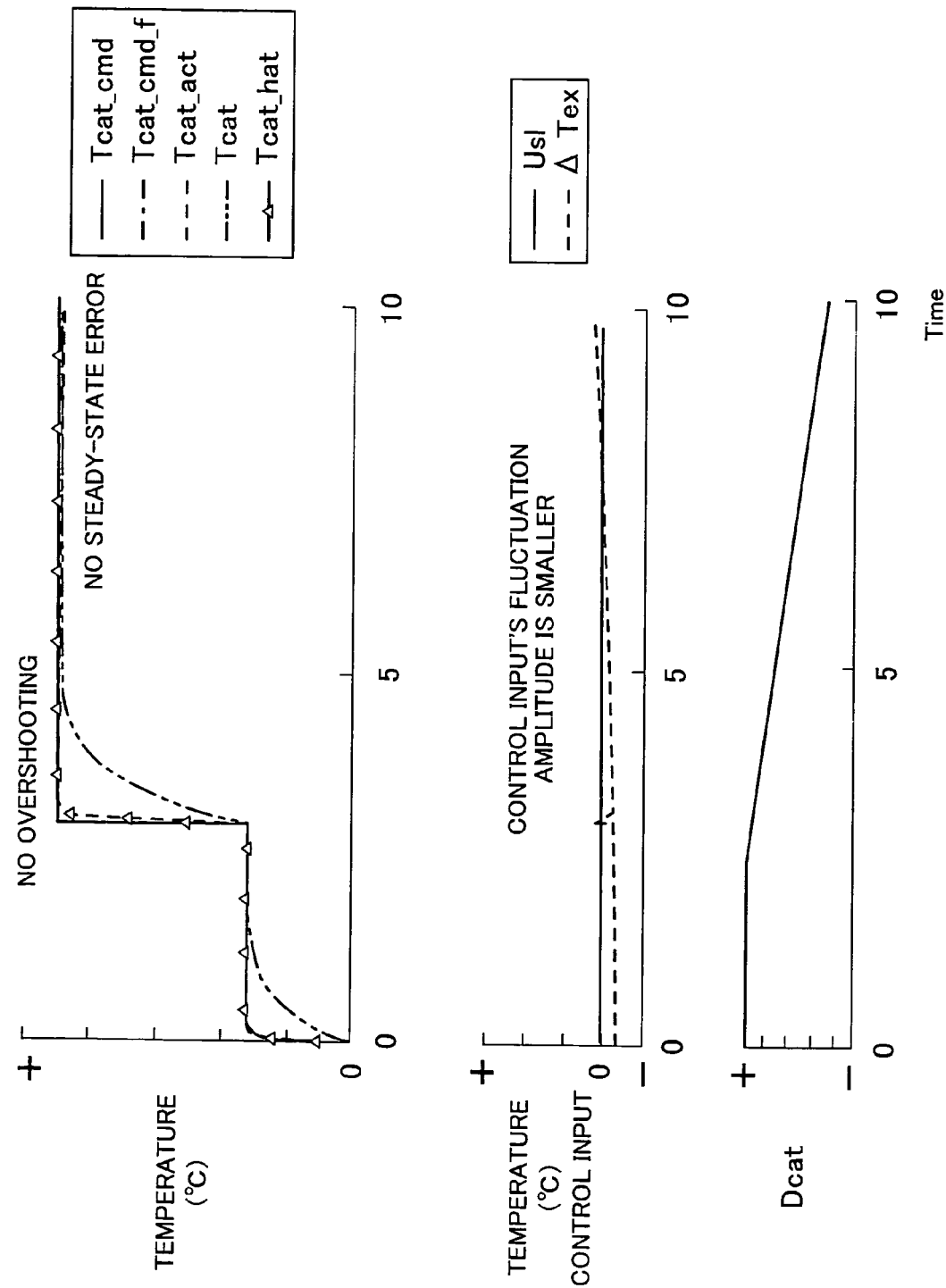
FIG. 14 is a set of graphs showing simulation results in the case of using the configuration shown in FIG. 13.

FIG. 14 is a set of graphs showing the simulation results in the case of using the configuration of FIG. 13. As is clear from FIG. 14, in the control system shown in FIG. 13, the actual catalyst temperature Tcat_act does not greatly overshoot the desired temperature Tcat_cmd and the fluctuation amplitude of the control input Usl is made very small. In addition, the steady-state error between the actual catalyst temperature Tcat_act and the desired temperature Tcat_cmd is suppressed.

In this embodiment, the ECU 80 carries out temperature control of the first and second catalytic converters 36 and 38 constituting the plant (controlled object). However, as shown in FIGS. 6, 9 and 13, the whole engine 10, including the exhaust system, is treated as the plant (controlled object) and with respect thereto the ECU 80 conducts variable mechanism control for controlling variable mechanisms of the engine 10 such as the variable phase mechanism 42, fuel injection quantity control for controlling fuel injection quantity, and ignition timing control for controlling ignition timing.

Figure 15:
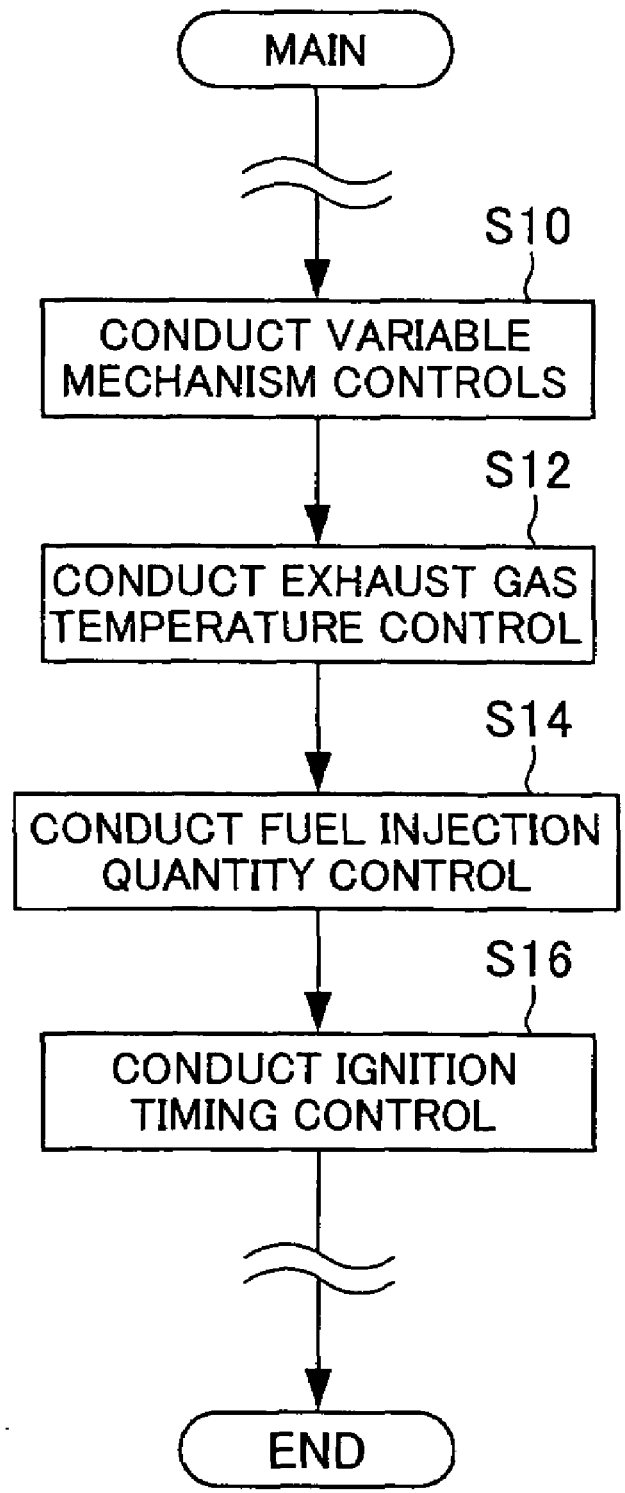
FIG. 15 is a flowchart showing the operation of the ECU shown in FIG. 1.

FIG. 15 is a flowchart showing the operation of the ECU 80.

The variable mechanism control is conducted in S10. Specifically, the variable lift mechanism 40, variable phase mechanism 42 and variable compression ratio mechanism 44 are controlled based on the operating conditions of the engine 10 detected from the sensor output such that the intake air quantity of the engine 10 is optimized under the detected operating conditions.

The ECU 80 executes the exhaust gas temperature control in S12, fuel injection quantity control in S14, and ignition timing control in S16. The processing of S10 and S12 is commenced with starting of the engine 10 and is thereafter executed at predetermined intervals of, for example 5 milliseconds. The processing of S14 and S16 is commenced with starting of the engine 10 and is thereafter executed synchronously with TDC or a crankangle in the vicinity thereof.

First, the variable mechanism control is conducted in S10.

Figure 16:
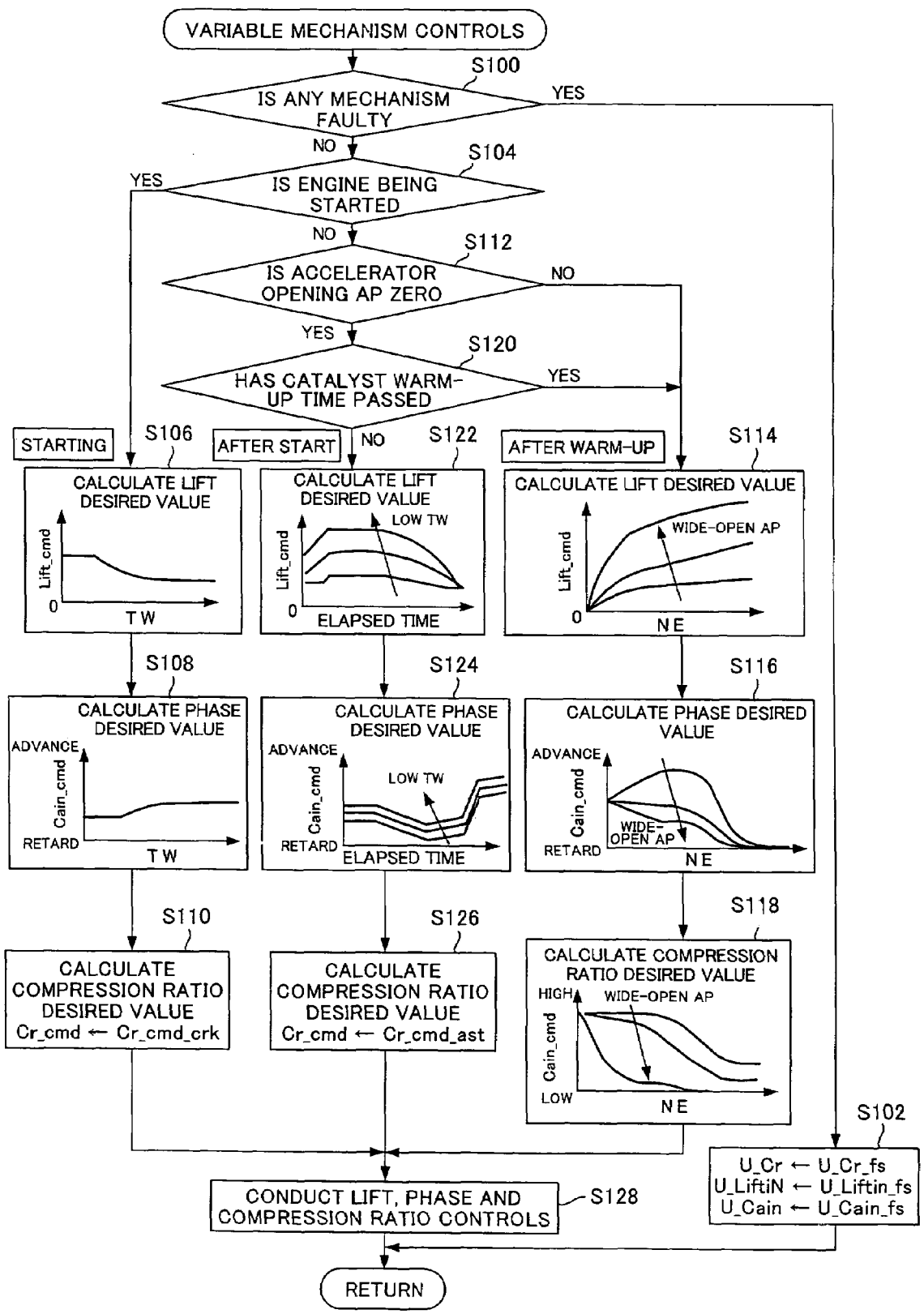
FIG. 16 is a subroutine flowchart showing the processing of the variable mechanism control shown in FIG. 15.

FIG. 16 is a subroutine flowchart showing the processing for this control.

In S100, it is determined whether any of three mechanisms, namely, the variable lift mechanism 40 and variable phase mechanism 42 of the valve mechanism, and the variable compression ratio mechanism 44, is faulty. When the result is YES, the program goes to S1102, in which the command value U_Cr to be supplied to the variable compression ratio mechanism 44 is set at a fail command value U_Cr_fs for establishing the final compression ratio, the command value U_Liftin to be supplied to the variable lift mechanism 40 is set to a fail command value U_Liftin_fs of a level enabling vehicle creep, and the command value U_Cain to be supplied to the variable phase mechanism 42 is set at a fail command value U_Cain_fs that puts the phase on the retard direction (specifically 0 (zero current application)).

When the result in S100 is NO, the program goes to S104, in which it is determined whether the engine 10 is being started. This is determined by checking whether the detected engine speed NE is below the full-firing engine speed.

When the result in S104 is YES, the program goes to S106, in which the lift desired value at starting Lift_cmd is calculated by retrieving the characteristic curve shown using the detected coolant temperature TW such that it increases with increasing friction, to S108, in which the phase desired value at starting Cain_cmd is calculated by retrieving the characteristic curve shown using the detected coolant temperature TW such that the combustion becomes stable. The program goes to S110 in which the compression ratio desired value at starting Cr_cmd is set to a fixed value Cr_cmd_crk such that the engine speed NE at cranking is increased and the unburned HC component is reduced.

When the result in S104 is NO, the program goes to S112, in which it is determined whether the detected accelerator opening AP is zero, i.e., whether the accelerator pedal is released. When the result in S112 is NO, which can be taken to mean that the operator wants driving power, the program goes to S114, in which the lift desired value after warm-up Lift_cmd is calculated by retrieving the characteristic curve shown using the detected engine speed NE and accelerator opening AP, to S116, in which the phase desired value after warm-up Cain_cmd is calculated by retrieving the characteristic curve shown using the detected engine speed NE and accelerator opening AP. The program goes to S118 in which the compression ratio desired value after warm-up Cr_cmd is calculated by retrieving the characteristic curve shown using the detected engine speed NE and accelerator opening AP.

When the result in S112 is YES, which can be taken to mean that the engine 10 is idling, the program goes to S120, in which it is determined whether the warm-up time period of the first and second catalytic converters 36 and 38 has elapsed. When the result in S120 is YES, the program goes to S114 and on. When the result in S120 is NO, the program goes to S122, in which, in order to warm up the first and second catalytic converters 36 and 38 faster, the lift desired value after start Lift_cmd is calculated by retrieving the characteristic curve shown using the elapsed time since engine starting and the detected coolant temperature TW.

Then the program goes to S124, in which the phase desired value at starting Cain_cmd is calculated by retrieving the characteristic curve shown using the elapsed time since engine starting and detected coolant temperature TW such that the pumping loss is increased and the intake air quantity is increased to promote the warm-up of the first and second catalytic converters 36 and 38. The program goes to S126 in which the compression ratio desired value at starting Cr_cmd is set to a fixed value Cr_cmd_ast defined such that the exhaust gas temperature is raised by lowering the heat efficiency owing to reduced compression ratio. Execution of the subroutine shown in FIG. 13 is commenced with starting of the engine 10 and is thereafter executed every 10 milliseconds. The time elapsed from engine starting can therefore be determined from the number of subroutine loops executed.

Next, in S128, the lift control, phase control and compression ratio control are conducted. Specifically, based on the desired values thus determined, the variable lift mechanism 40, variable phase mechanism 42 and variable compression ratio mechanism 44 are controlled using the algorithm of the two-degree-of-freedom response designation control. Since the details thereof is not a gist of the invention, no further explanation will be made.

The explanation of the flowchart of FIG. 15 will be resumed. Next, in S12, exhaust gas temperature control is conducted.

Figure 17:
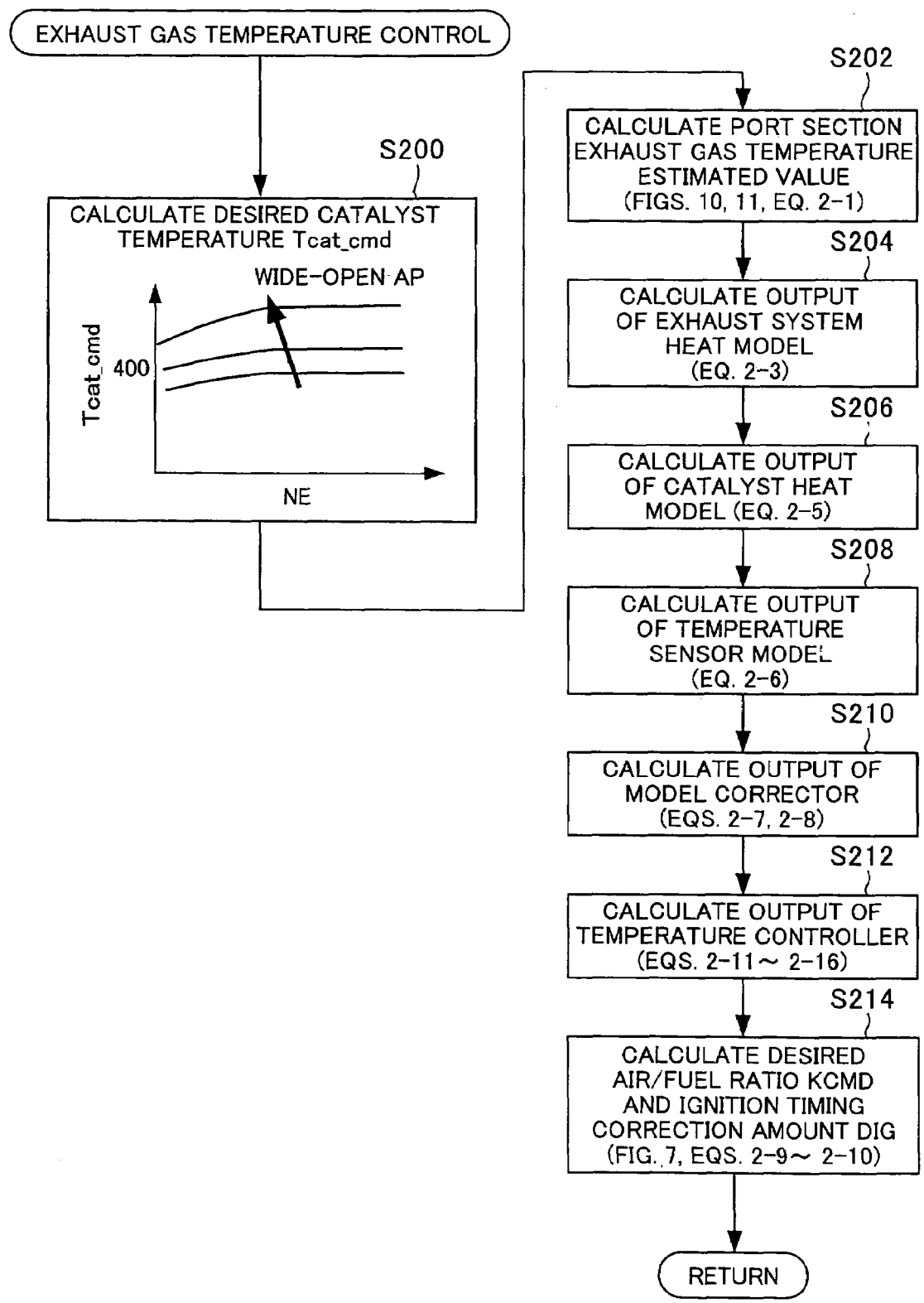
FIG. 17 is a subroutine flowchart showing the processing of exhaust gas temperature control shown in FIG. 15.

FIG. 17 is a subroutine flowchart showing the processing for this control.

In S200, the desired catalyst temperature Tcat_cmd is calculated by retrieving the illustrated characteristic curve by using the current engine speed NE and accelerator opening AP. So as to avoid fuel overcooling, the desired temperature Tcat_cmd is determined or defined as shown to increase with increasing engine load (accelerator opening AP) and increasing engine speed NE, i.e, under conditions that increase the catalyst temperature.

Next, in S202, the port section exhaust gas temperature estimated value Tex_hat is calculated. This is done by calculation using Equation 2-1 while deriving required data from the characteristic curves of FIGS. 10A to 10C and 11.

The program then goes to S204, in which the output of the exhaust system heat model 80a2 is calculated in accordance with Equation 2-3, to S206, in which the output of the catalyst heat model 80a3 is calculated in accordance with Equation 2-5, and to S208, in which the output of the temperature sensor model 80a5 is calculated in accordance with Equation 2-6.

The program next goes to S210, in which the output of the model corrector 80a6 is calculated in accordance with Equations 2-7 and 2-8, and then to S212, in which the output of the temperature controller 80a4 is calculated in accordance with Equations 2-11 to 2-16.

Next, in S214, the ignition timing correction amount DIG and desired air/fuel ratio KCMD are calculated in accordance with Equations 2-9 and 2-10 while retrieving required data from the characteristic curves of FIG. 7. This completes the processing by this subroutine.

The explanation of the flowchart of FIG. 15 will be resumed. Next, in S114, fuel injection quantity control is conducted.

Figure 18:
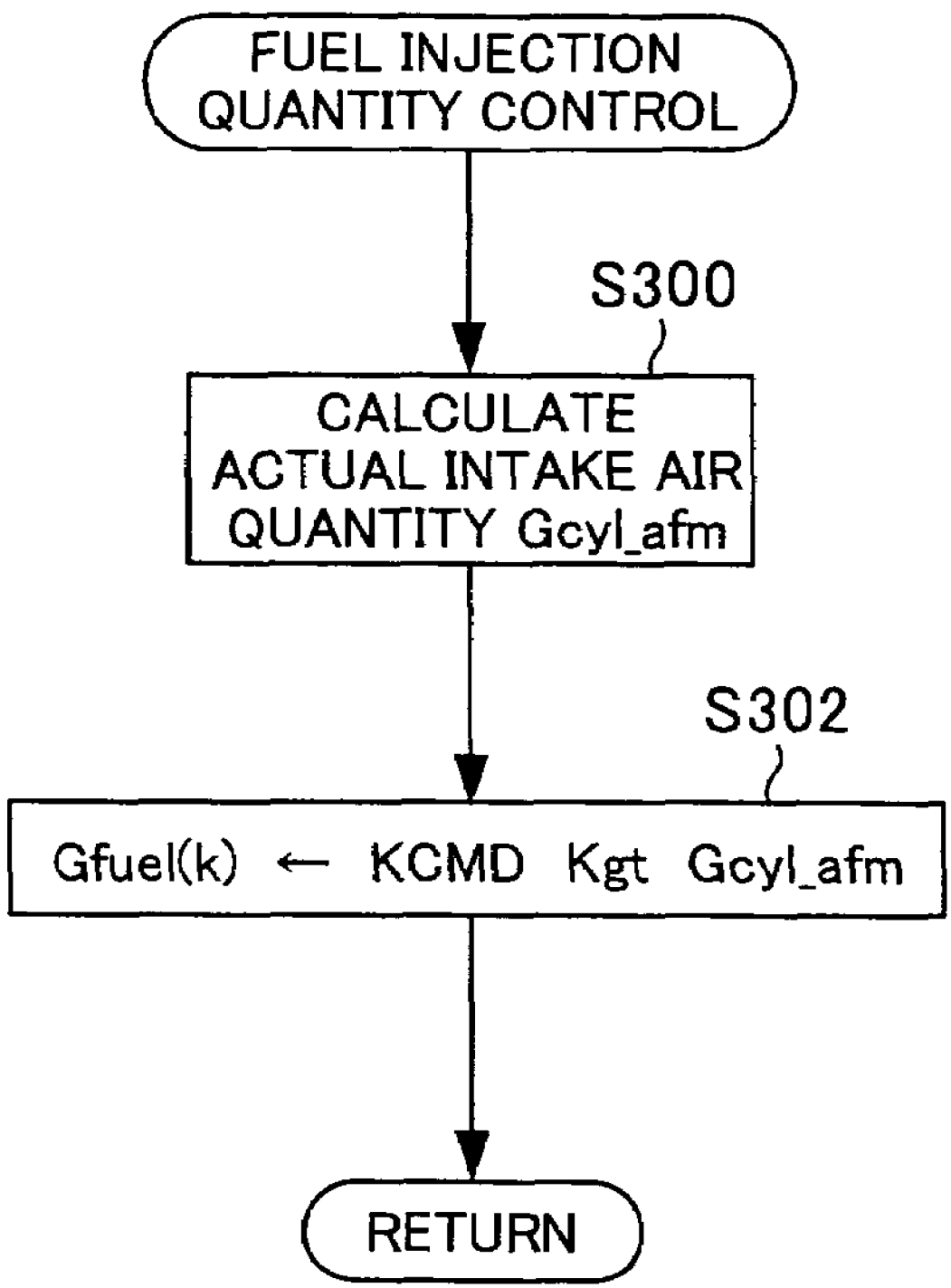
FIG. 18 is a subroutine flowchart showing the processing of fuel injection quantity control shown in FIG. 15.

FIG. 18 is a subroutine flowchart showing the processing for this control.

In S300, the actual intake air quantity Gcyl_afm is calculated from the output of the airflow meter 68 in accordance with the equation as:

$$Gcyl\_afm(g/cyl)=60 \times Gin\_afm/(2 \times NE).$$

In other words, the effect of pulsation is eliminated by calculating the actual intake air quantity Gcyl_afm (g/cyl) for each cylinder in accordance with the foregoing equation using the value of Gcyl_afm obtained by sampling the output of the airflow meter 68 every CRK signal and averaging the sampled values over the TDC interval.

Next, in S302, the equation shown is used to calculate fuel injection quantity Gfuel(k) by multiplying desired air/fuel ratio KCMD by the value Kgt and the calculated actual intake air quantity Gcyl_afm. Kgt in the shown equation is a conversion coefficient for calculating the fuel injection quantity from actual intake air quantity Gcyl_afm. The multiplication signs are omitted in FIG. 18 and elsewhere.

The explanation of the flowchart of FIG. 15 will be resumed. Next, in S16, ignition timing control is conducted.

Figure 19:
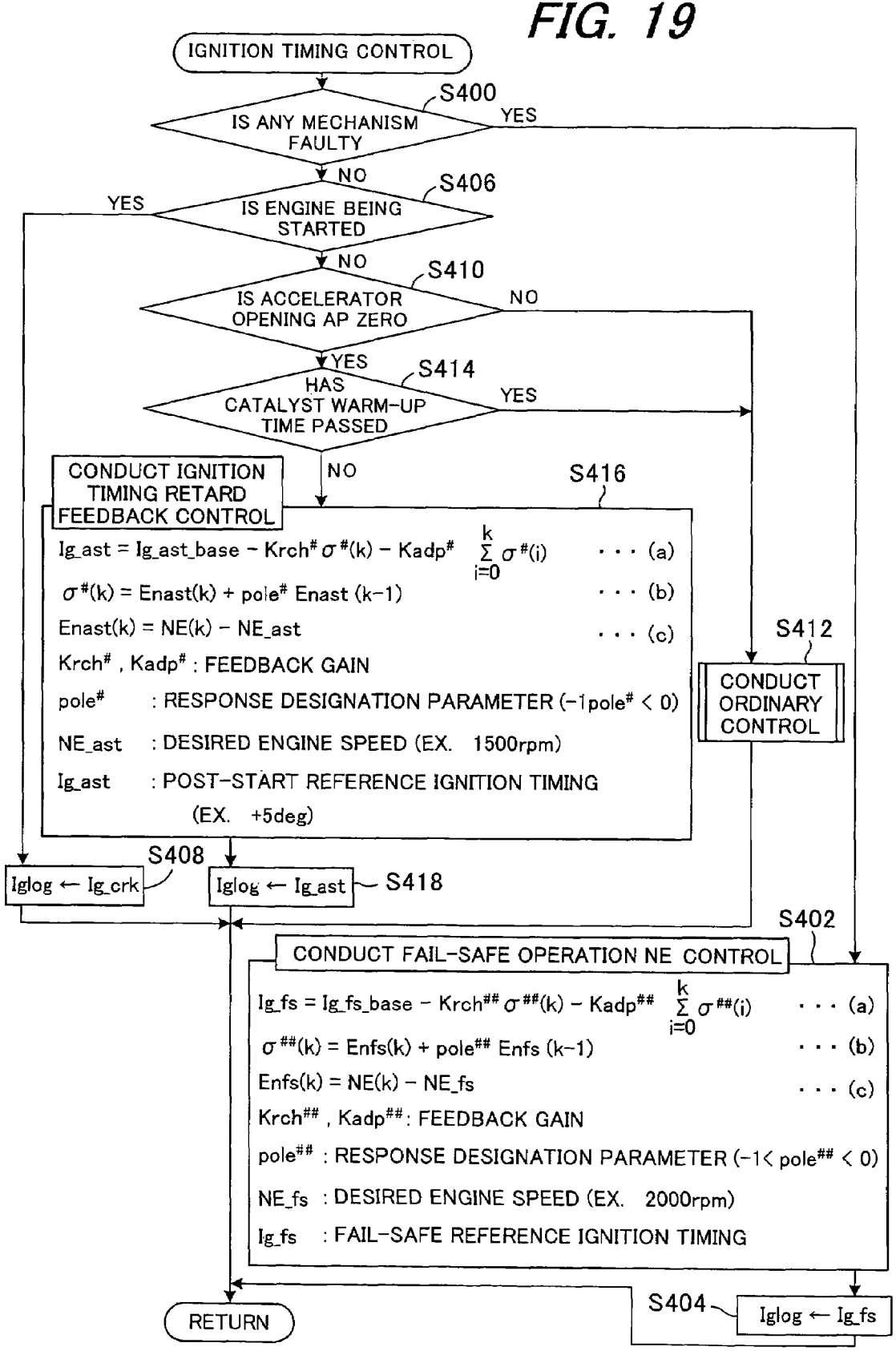
FIG. 19 is a subroutine flowchart showing the processing of ignition timing control shown in FIG. 15.

FIG. 19 is subroutine flowchart similar to that of FIG. 16 showing the processing for this control.

In S400, it is determined whether any mechanism among the variable lift mechanism 40 and other two mechanisms is faulty. When the result is YES, the program goes to S402, in which fail-safe operation NE control is conducted in accordance with simplified one-degree-of-freedom sliding mode control, similarly to what has been explained with respect to FIG. 16.

Since torque control of the valve mechanisms is impossible during fail-safe operation, the processing of S402 is for controlling the torque by determining the ignition timing so as to maintain the engine speed NE constant.

First, as indicated by Equation (c), error Enfs(k) is calculated by subtracting the desired engine speed NE_fs (e.g., 2,000 rpm) from the engine speed detected value NE(k) and then, as indicated by Equation (b), the product obtained by multiplying the value of the error in the last or preceding cycle by response designation parameter pole## is added to the value of the error in the current cycle to calculate switching function σ##(k).

Next, as indicated by Equation (a), the product obtained by multiplying the integral of the switching function by second feedback gain Kadp# is subtracted from the product obtained by multiplying the switching function σ##(k) by first feedback gain Krch## and the difference obtained is subtracted from the base value Ig_fs_base of fail-safe reference ignition timing Ig_fs to calculate the fail-safe reference ignition timing Ig_fs.

Next, in S404, the calculated fail-safe reference ignition timing is defined as ignition timing Iglog.

On the other hand, when the result in S400 is NO, the program goes to S406, in which it is determined whether the engine 10 is being started. When the result is YES, the program goes to S408, in which the ignition timing Iglog is set to ignition timing at cranking Ig_crk.

When the result in S406 is NO, the program goes to S410, in which it is determined whether the detected accelerator opening AP is zero. When the result is NO, which can be taken to mean that the operator wants driving power, the program goes to S412, in which ordinary control is conducted.

Figure 20:
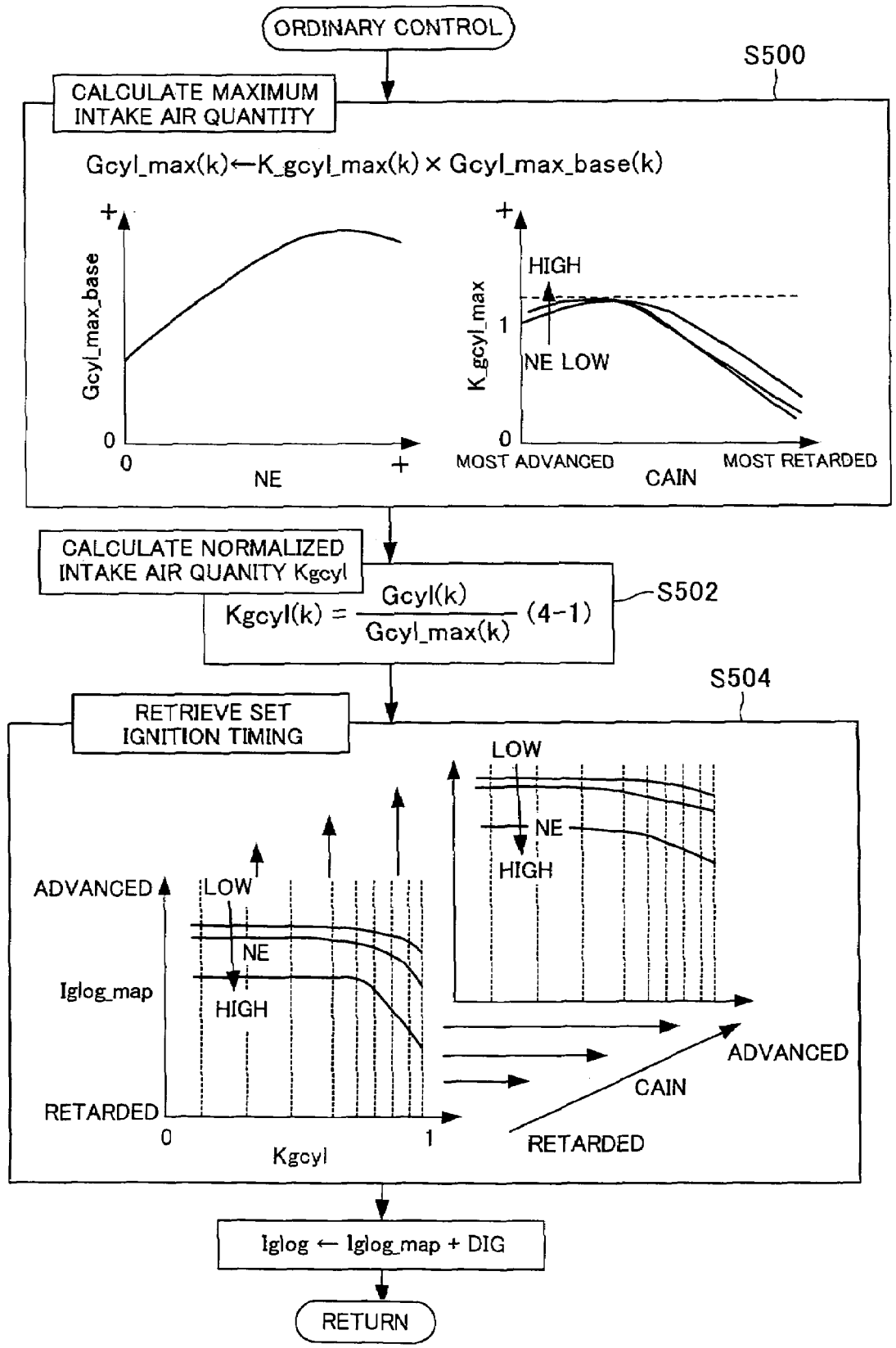
FIG. 20 is a subroutine flowchart showing the processing of ordinary control shown in FIG. 19.

FIG. 20 is subroutine flowchart showing the processing for this control.

First, in S500, the maximum intake air quantity Gcyl_max is calculated in accordance with the equation shown. Gcyl_max_base in the equation indicates the base value of the maximum intake air quantity Gcyl_max and the value thereof for the current engine speed NE is derived or retrieved from the characteristic curve shown on the left in the drawing. K_gcyl_max_base in the equation is a correction value and the value thereof for the current phase CAIN is derived or retrieved from a characteristic curve shown on the right in the drawing. Increasing/decreasing the phase CAIN increases the internal EGR (exhaust gas recirculation) amount during ignition timing advance owing to increase in the overlap amount and increases the blowback amount caused by retarding valve close timing, so that the maximum intake air quantity Gcyl_max decreases. The correction value is therefore defined as shown to carry out correction in accordance with the phase CAIN.

Next, in S502, normalized intake air quantity Kgcyl is calculated in accordance with the equation shown (Equation 4-1). Then, in S504, set ignition timing Iglog_map is retrieved from the illustrated characteristic map using the calculated normalized intake air quantity Kgcyl and the current engine speed NE as address data. As shown, the set ignition timing Iglog_map is defined to retard with increasing engine speed NE. Further, the set ignition timing Iglog_map is defined to advance with advance of the phase CAIN because during advance of the phase CAIN the internal EGR amount increases owing to increase in the overlap amount, thereby decreasing the flaming speed in the combustion chamber.

The reason for using the normalized value of the intake air quantity is to avoid increasing the value of the set ignition timing Iglog_map. In other words, the absolute value of the maximum intake air quantity Gcyl_max varies markedly because the charging efficiency varies with engine speed. The ignition timing in the vicinity of the maximum intake air quantity Gcyl_max where knock readily occurs needs to be defined by fine map lattice points. However, owing to the fact that the maximum intake air quantity Gcyl_max differs greatly between different engine speeds, the volume of the mapped data becomes huge when the ignition timing data is defined finely in the vicinity of the maximum intake air quantity Gcyl_max at every engine speed. When normalized values are used in response to this point, increase in the amount of map data to a huge volume can be avoided because the region in which knock readily occurs coincides among different engine speeds.

Next, in S506, the ignition timing correction amount DIG for the current control input Usl determined from the characteristic curve shown in FIG. 7 is added to the retrieved set ignition timing Iglog_map to calculate ignition timing Iglog.

The explanation of FIG. 19 will be resumed.

When the result in S410 is YES, the program goes to S414, in which it is determined whether the warm-up time period of the first and second catalytic converters 36 and 38 has elapsed. When the result is YES, the program goes to S412, and when it is NO, the program goes to S416, in which, by processing similar to that in S402, feedback control of the ignition timing retarding is conducted in accordance with simplified sliding mode control.

Specifically, as indicated by Equation (c), deviation Enast (k) is calculated by subtracting the desired engine speed NE_ast (e.g., 1,500 rpm) from the engine speed detected value NE(k) and then, as indicated by Equation (b), the product obtained by multiplying the value of the error in the preceding cycle by response designation parameter pole# is added to the value of the error in the current cycle to calculate switching function σ#(k).

Next, as indicated by Equation (a), the product obtained by multiplying the integral of the switching function by second feedback gain Kadp# is subtracted from the product obtained by multiplying the switching function σ#(k) by first feedback gain Krch# and the difference obtained is subtracted from the base value Ig_ast_base of post-start reference ignition timing Ig_ast to calculate the post-start reference ignition timing Ig_ast (e.g., 5 degrees). The program then goes to S418, in which the ignition timing Iglog is set to the calculated post-start reference ignition timing.

As explained in the foregoing, the plant temperature control system according to the first embodiment is equipped with the temperature sensor 76 for producing an output indicative of the temperature Tcat of the exhaust system (plant) 34, the catalyst (CAT) heat model (plant model) 80a3 for calculating the temperature estimated value Tcat_hat of the plant, the temperature sensor model 80a5 responsive to input of the calculated plant temperature estimated value for calculating the output estimated value Tcat_sm of the temperature sensor, and the temperature controller 80a4 for controlling the plant temperature based on the calculated plant temperature estimated value, and is further equipped with the model parameter corrector 80a6 for correcting the parameter of the plant model so as to minimize error Eest between the temperature sensor output Tcat and the calculated output estimated value Tcat_sm. Owing to this configuration, even in the case where the temperature sensor 76 has a large response lag, the temperature estimated value by the plant model can nevertheless be corrected with high accuracy to enable control of the temperature of the exhaust system (plant) 34 to the desired value without, for example, causing severe overshooting. Further, the temperature of the first and second catalytic converters 36 and 38 does not rise to a high level even temporarily, so that degeneration and melting damage of the first and second catalytic converters 36 and 38 can be prevented.

Further, the plant model comprises the exhaust system heat model 80a2 for estimating the temperature of the exhaust system 34 upstream of the first and second catalytic converters 36 and 38 installed in the exhaust system 34 and the catalyst heat model 80a3 for calculating the temperature estimated value Tcat_hat of the first and second catalytic converters 36 and 38, and the model parameter corrector 80a6 corrects the parameter (Equation 2-4) of the catalyst heat model based on at least the output of the temperature sensor. Owing to this configuration, it is possible not only to achieve the foregoing effects or advantages but in addition to avoid rise of the catalyst temperature to a high level even temporarily should the heating effect of the first and second catalytic converters 36 and 38 change owing to change with aging and/or variation in exhaust gas composition, whereby degeneration and melting damage of the first and second catalytic converters 36 and 38 can be prevented and the purification rate can be prevented from becoming unsuitable owing to the catalyst temperature becoming too low.

Figure 21:
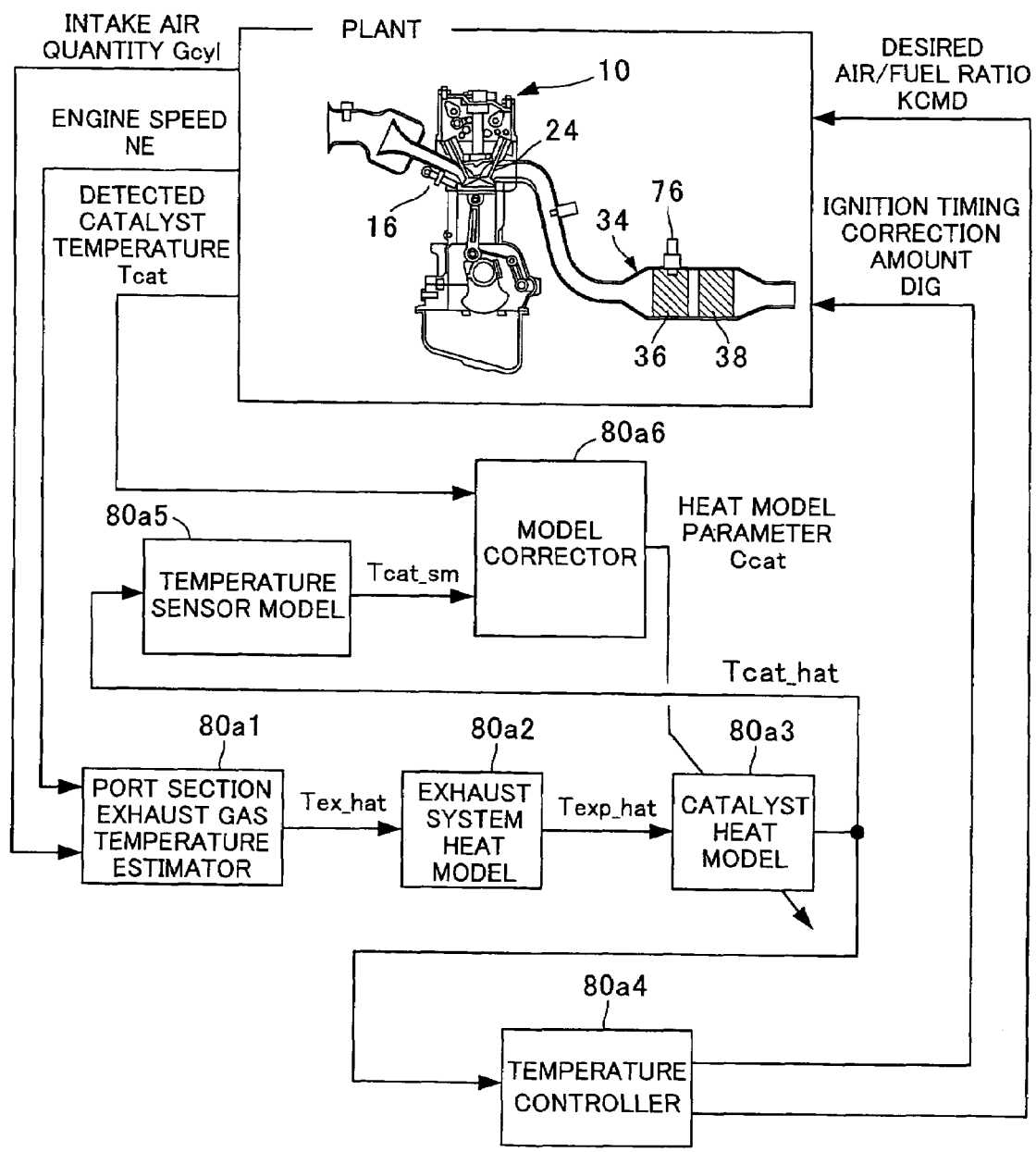
FIG. 21 is a block diagram similar to FIG. 13 showing the structure of a plant temperature control system according to a second embodiment.

FIG. 21 is a block diagram similar to that of FIG. 13 showing the configuration of a plant temperature control system according to a second embodiment of the invention.

The catalyst heat model 80a3 of the plant temperature control system according to the first embodiment is corrected for all temperature estimation-related errors by the correction term Dcat. However, the Tcat_hat estimation error is produced chiefly by aging of the first and second catalytic converters 36 and 38 and change in the reaction heat of the NOx catalyst converter 36 caused by, for example, change in the unburned gas properties.

In response to this point, the heat model parameter Ccat of the catalyst heat model 80a3 in the plant temperature control system according to the second embodiment is, as shown in FIG. 21, replaced with one sequentially calculated by the model corrector 80a6 and the model corrector 80a6 is modified as shown.

In the second embodiment, the catalyst heat model 80a3 is represented by the following equations.

$$\frac{Tcat\_hat(k) - Tcat\_hat(k-1)}{\Delta T} = \quad (3\text{-}1)$$
$$Acat(Tcat\_hat(k-1) - TA(k-1)) - \frac{Bcat\,Gcyl(k-1)}{Lcat\,Gcyl\_max}$$
$$(Texp\_hat(k-1) - Tcat\_hat(k-1)) + Ccat\,Gcyl(k-1)$$

$$\Downarrow \quad (3\text{-}2)$$
$$Tcat\_hat(k) = \left(Acat\,\Delta T + 1 + \frac{Bcat\,Gcyl(k-1)\Delta T}{Lcat\,Gcyl\_max}\right)Tcat\_hat(k-1) -$$
$$\frac{Bcat\,Gcyl(k-1)}{Lcat\,Gcyl\_max}Texp\_hat(k-1)\Delta T -$$
$$Acat\,TA(k-1)\Delta T + Ccat\,Gcyl(k-1)\Delta T$$

where

Acat, Bcat: Heat model parameters

Ccat: Heat model parameter sequentially estimated by model corrector

TA(): Atmospheric temperature

Lcat: Catalyst length

ΔT: Sampling/control cycle

The model corrector 80a6 is represented by the following equations.

$$Ccat(k) = Ccat(k-1) + \frac{Pest\, Gcyl(k-1)}{1 + Gcyl(k-1)Pest\, Gcyl(k-1)} Eest(k) \quad (3\text{-}3)$$

$$Eest(k) = T\text{cat\_sm}(k) - Tcat(k) \quad (3\text{-}4)$$

where

Pest: Correction gain (Pest>0)

The foregoing configuration of the plant temperature control system according to the second embodiment enables it to achieve the same advantages or effects as those achieved by the first embodiment.

Figure 22:
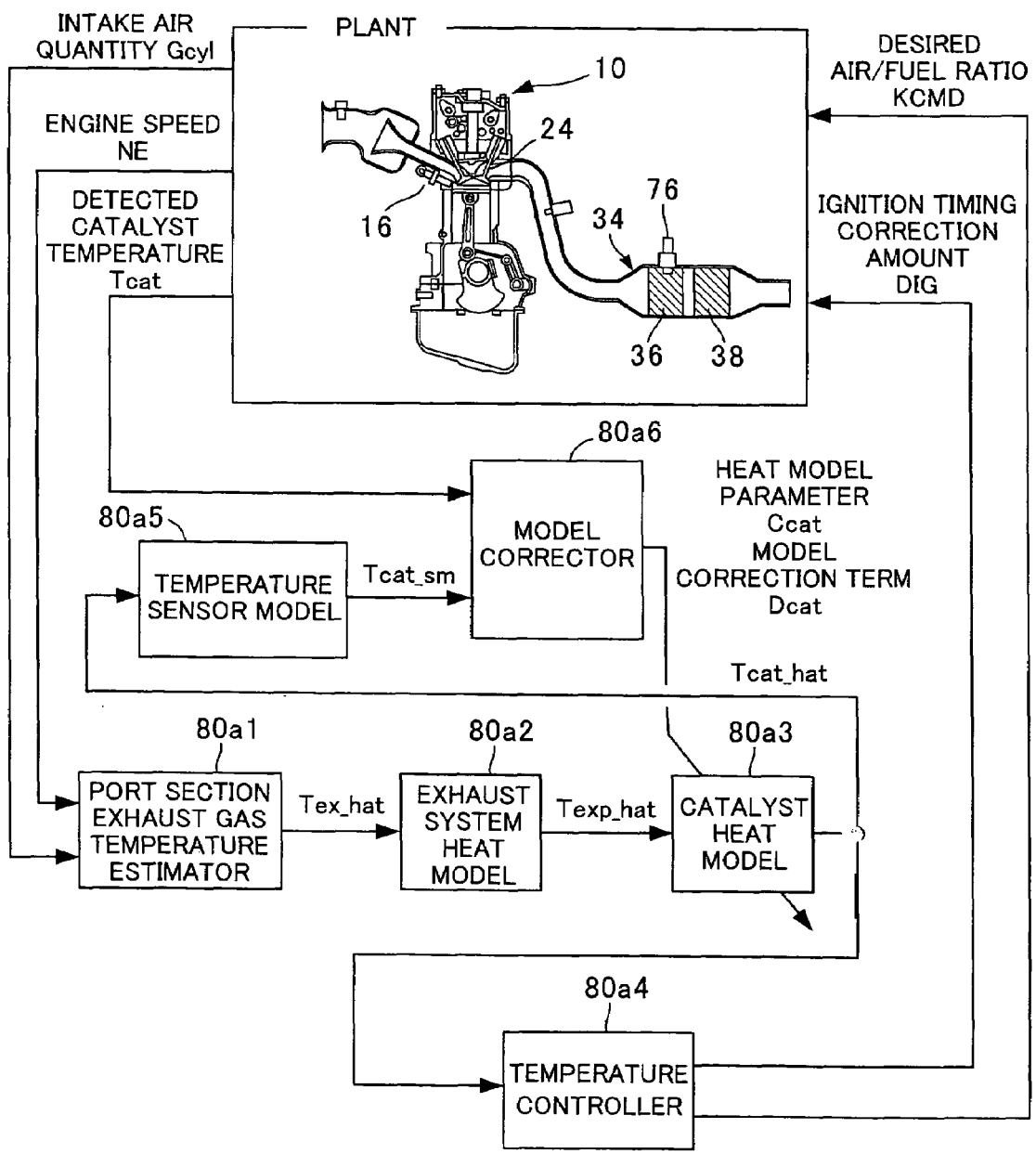
FIG. 22 is a block diagram similar to FIG. 13 showing the structure of a plant temperature control system according to a third embodiment.

FIG. 22 is a block diagram similar to that of FIG. 13 showing the configuration of a plant temperature control system according to a third embodiment of the invention.

In the second embodiment shown in FIG. 21, the heat model parameter Ccat of the catalyst heat model 80a3, which parameter is the chief cause of error in the estimation of Tcat_hat, is sequentially calculated by the model corrector 80a6. The plant temperature control system according to the third embodiment is configured to make concurrent use of the model correction term Dcat utilized in the control system of the first embodiment shown in FIG. 13.

In the third embodiment, the catalyst heat model 80a3 is represented by the following equations.

$$\frac{T\text{cat\_hat}(k) - T\text{cat\_hat}(k-1)}{\Delta T} = Acat(T\text{cat\_hat}(k-1) - TA(k-1)) - \quad (3\text{-}5)$$
$$\frac{Bcat\, Gcyl(k-1)}{Lcat\, Gcyl\_max}(T\text{exp\_hat}(k-1) - T\text{cat\_hat}(k-1)) +$$
$$Ccat(k-1)Gcyl(k-1) + Dcat(k-1)$$
$$\Downarrow$$

$$T\text{cat\_hat}(k) = \left(Acat\Delta T + 1 + \frac{Bcat\, Gcyl(k-1)\Delta T}{Lcat\, Gcyl\_max}\right)T\text{cat\_hat}(k-1) - \quad (3\text{-}6)$$
$$\frac{Bcat\, Gcyl(k-1)}{Lcat\, Gcyl\_max}T\text{exp\_hat}(k-1)\Delta T - AcatTA(k-1)\Delta T +$$
$$Ccat(k-1)Gcyl(k-1)\Delta T + Dcat(k-1)\Delta T$$

where

Acat, Bcat: Heat model parameters

Ccat: Heat model parameter sequentially estimated by model corrector

Dcat: Model correction term calculated by model corrector

TA(): Atmospheric temperature

Lcat: Catalyst length

ΔT: Sampling/control cycle

The model corrector 80a6 is represented by the following equations.

$$\theta(k) = \theta(k-1) + \frac{Pest\, \zeta(k)}{1 + \zeta^T(k)\, Pest\, \zeta(k)} Eest(k) \quad (3\text{-}7)$$

$$Eest(k) = T\text{cat\_sm}(k) - Tcat(k) \quad (3\text{-}8)$$

$$\theta^T(k) = [Cest(k) Dest(k)] \quad (3\text{-}9)$$

$$\zeta^T(k) = [Gcyl(k-1)1] \quad (3\text{-}10)$$

where

Pest: Correction gain (Pest>0)

The foregoing configuration of the plant temperature control system according to the third embodiment enables it to achieve the same advantages and effects as those achieved by the first embodiment.

Figure 23:
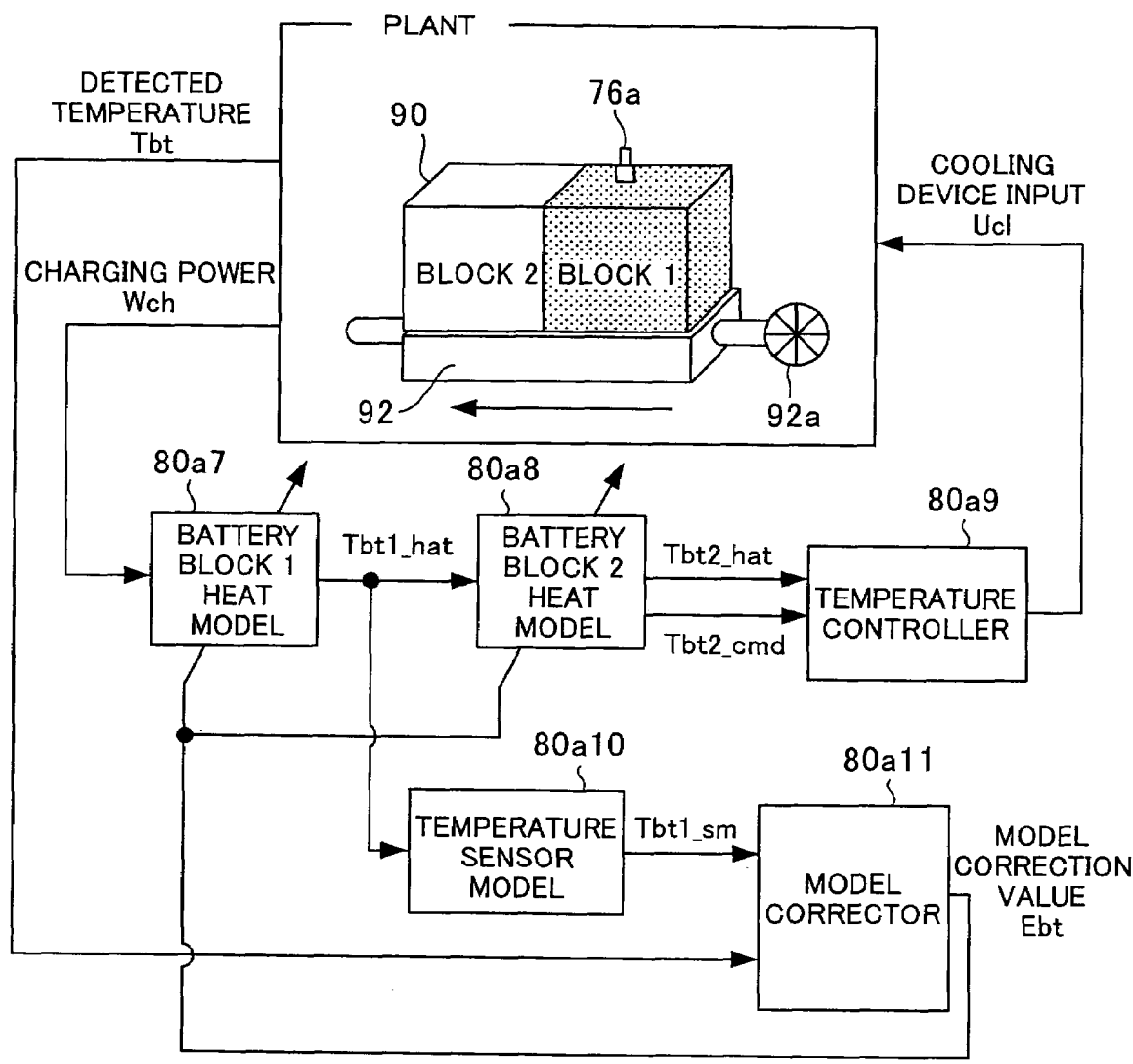
FIG. 23 is a block diagram similar to FIG. 13 showing the structure of a plant temperature control system according to a fourth embodiment.

FIG. 23 is a block diagram similar to that of FIG. 13 showing the configuration of a plant temperature control system according to a fourth embodiment of the invention.

The charging of a battery, such as one installed in an electric vehicle or hybrid electric vehicle (HEV) causes a chemical reaction that generates heat, so that rapid charging is liable to damage the battery by increasing its temperature to an abnormally high level. On-board batteries are therefore equipped with cooling devices.

One possible way of maintaining the actual battery temperature at not higher than a desired temperature would be to install a temperature sensor in association with the battery (plant) and control the cooling capability of the cooling device by a control input in accordance with the output from a control algorithm like that explained with respect to the first embodiment.

However, a temperature sensor fabricated to withstand the vibration and other harsh environmental conditions encountered during use in connection with an on-board battery does not offer good response performance. The cooling control is therefore too slow at the time of rapid temperature increase and the battery is liable to be damaged as a result.

Most batteries are divided into a number of blocks that are individually cooled to varying degrees by the ambient air and the cooling device. Although this variation can be monitored by installing a temperature sensor in conjunction with each block so as to enable the blocks to be temperature controlled individually, this solution would not only be expensive but also lower fuel efficiency by adding to the weight of the vehicle utilizing the battery.

A need has therefore been felt for a technology capable of compensating the response lag of the temperature sensor so as to control the temperature Tbt_act of the individual battery blocks to not higher than the desired temperature Tbt_cmd, without installing a large number of sensors and without overly limiting the charging speed.

In light of the foregoing, the fourth embodiment is provided to achieve temperature control that meets this need by applying the configuration of the first embodiment to the temperature control system of a battery 90 as shown FIG. 23.

The plant of the fourth embodiment is the rechargeable battery 90 that is used in an HEV (hybrid electric vehicle) driven by an internal combustion engine and electric motors as taught by the assignee's Japanese Laid-Open Patent Application No. 2004-306646.

The battery 90 is cooled by a cooling device 92. It is divided into m-number (m>2, more specifically m=2) of blocks, specifically into blocks 90a, 90b. The cooling device 92 is equipped with a cooling pump 92a that is driven by an actuator (not shown) to supply coolant into the interior of the cooling device 92 in the direction of the arrow. The block 90a of the battery 90 on upstream side of coolant flow is designated block 1 and the block 90b on the downstream side is designated block 2. The direction of current flow between the blocks is the same as the direction of coolant flow.

A temperature sensor 76a is mounted on the block 1 and produces an output Tbt_act indicative of the block temperature. The illustrated configuration further includes a battery block 1 heat model 80a7, battery block 2 heat model 80a8, temperature controller 80a9, temperature sensor model 80a10, and model corrector 80a11. The cooling capability of the cooling device 92 is controlled by a control input Ucl in accordance with the output Tbt_act of the temperature sensor 76a, thereby controlling the actual battery temperature Tbt_act to not higher than the desired temperature Tbt_cmd.

The block 1, 2 heat models are represented by the following equations.

$$\frac{Tbt1(k) - Tbt1(k-1)}{\Delta T} = \quad (3\text{-}11)$$
$$Abt1\{Tbt1(k-1) - TA(k-1)\} + Bbt1\{Tbt1(k-1) - Tbt2(k-1)\} +$$
$$Cbt1\ Wch(k-1) + Dbt1\{Tbt1(k-1) - Tcl(k-1)\}Ucl(k-1)$$

$$\frac{Tbt2(k) - Tbt2(k-1)}{\Delta T} = \quad (3\text{-}12)$$
$$Abt2\{Tbt2(k-1) - TA(k-1)\} + Bb2\{Tbt2(k-1) - Tbt1(k-1)\} +$$
$$Cbt2\ Wch(k-1) + Dbt2\{Tbt2(k-1) - Tcl(k-1)\}Ucl(k-1)$$
$$\Downarrow$$

$$Tbt1(k) = \quad (3\text{-}13)$$
$$(Abt1\Delta T + Bbt1\Delta T - 1)Tbt1(k-1) - Bbt1\Delta T\ Tbt2(k-1) -$$
$$Abt1\Delta T\ TA(k-1) + Cbt1\Delta T\ Wch(k-1) +$$
$$Dbt1\Delta T\{Tbt1(k-1) - Tcl(k-1)\}Ucl(k-1)$$

$$Tbt2(k) = \quad (3\text{-}14)$$
$$(Abt2\Delta T + Bbt2\Delta T - 1)Tbt2(k-1) - Bbt2\Delta T\ Tbt1(k-1) -$$
$$Abt2\Delta T\ TA(k-1) + Cbt2\Delta T\ Wch(k-1) +$$
$$Dbt2\Delta T\{Tbt2(k-1) - Tcl(k-1)\}Ucl(k-1)$$

where

Abti, Bbti, Cbti, Dbti: Heat model parameters (i=1, 2: block no.)

Ucl(): Cooling device input voltage

TA(): Atmospheric temperature

Tcl(): Coolant temperature

Wch: Amount of charging power

ΔT: Sampling/control cycle

On the left side of Equation 3-11, the first term is a heat dissipation term, the second term is a heat transmission term, the third term is a heat generation term, and the last term is a cooling term.

The temperature sensor 76a is mounted on the block 1 and the control algorithm for controlling the actual temperature Tbt2_act of the block 2 not provided with a temperature sensor to not higher than the desired value value Tbk_cmd is given by the equation below.

In other words, the battery block 1 heat model 80a7 is represented by the following equation.

$$Tbt1\_hat(k) = (Abt1\Delta T + Bbt1\Delta T - 1)Tbt1\_hat(k-1) - \quad (3\text{-}15)$$
$$Bbt1\Delta T\ Tbt2\_hat(k-1) -$$

-continued
$$Abt1\Delta T\ TA(k-1) + Cbt1\Delta T\ Wch(k-1) +$$
$$Dbt1\Delta T\{Tbt1\_hat(k-1) - Tcl(k-1)\}Ucl(k-1) + Ebt(k-1)$$

where

Tbt1_hat(): Block 1 temperature estimated value

Ebt(): Model correction value

The temperature sensor model 80a10 is represented by the following equation.

$$Tbt1\_sm(k) = (1+Ksm')Tbt1\_sm(k-1) - Ksm'Tbt1\_hat(k) \quad (3\text{-}19)$$

where

Tbt1_sm(): Temperature sensor output estimated value

Ksm': Sensor lag coefficient (−1<Ksm'<0)

The model corrector 80a11 is represented by the following equations.

$$Ebt(k) = Ebt(k-1) + \frac{Pest'}{1 + Pest'} Eest'(k) \quad (3\text{-}17)$$

$$Eest'(k) = Tbt1\_sm(k) - Tbt1(k) \quad (3\text{-}18)$$

where

Pest': Correction gain (Pest'>0)

Tbt1: Temperature sensor output (detected temperature of block 1)

The battery block 2 heat model 80a8 is represented by the following equation.

$$Tbt2\_hat(k) = (Abt2\Delta T + Bbt2\Delta T - 1)Tbt2\_hat(k-1) - \quad (3\text{-}19)$$
$$Bbt2\Delta T\ Tbt1\_hat(k-1) -$$
$$Abt2\Delta T\ TA(k-1) + Cbt2\Delta T\ Wch(k-1) +$$
$$Dbt1\Delta T\{Tbt2\_hat(k-1) - Tcl(k-1)\}Ucl(k-1) + Ebt(k-1)$$

where

Tbt2_hat(): Block 2 temperature estimated value

The temperature controller 80a9 is represented by the following equations.

$$Ucl = \begin{cases} 0 & (Usl'(k) > 0) \quad \text{here, Positive side zero because heating impossible} \\ |Usl'(k)| & (Usl'(k) \le 0)) \quad \text{here, Positive and negative reversed because cooling effect great when Ucl} \to \text{Large} \end{cases} \quad (3\text{-}20)$$

$$Usl'(k) = Urch'(k) + Uadp'(k) \quad (3\text{-}21)$$

$$Urch'(k) = -Krch'\sigma'(k) \quad (3\text{-}22)$$

$$Uadp'(k) = -Kadp' \sum_{i=0}^{k} \sigma'(i) \quad (3\text{-}23)$$

-continued $$\sigma'(k) = Etbt(k) + S'Etbt(k-1) \quad (3\text{-}24)$$

$$Etbt(k) = Tbt2\_hat(k) - Tbt\_cmd\_f(k) \quad (3\text{-}25)$$

$$Tbt\_cmd\_f(k) = -R'Tbt\_cmd\_f(k-1) + (1+R')Tbt\_cmd(k) \quad (3\text{-}26)$$

where

Krch', Kadp': Feedback gains

S': Switching function parameter

R': Desired value filter coefficient Here, (−1<R'<S'>0)

Because the block 2 is not provided with a temperature sensor 76a, the control system algorithm shown in FIG. 23 is configured to calculate the estimated value Tbt2_hat of the temperature of the block 2 using the battery block 2 heat model 80a8 according to Equation 3-19 and calculate the control input Uci of the cooling device 92 based on the estimated value.

At this time, the temperature of the block 1 used by the battery block 2 heat model 80a8 of Equation 3-19 is not the raw temperature sensor output Tbt1, which involves a large delay, but the block 1 temperature estimated value Tbt1_hat obtained using the battery block 1 heat model (Equation 3-15). In addition, the battery block 1 heat model 80a7 changes the correction value Ebt so as to correct the temperature output estimated value Tbt1_sm calculated by inputting its output Tbt1_hat to the temperature sensor model 80a10 so as to make it equal to the sensor output Tbt1 (i.e., so as to minimize its error).

Figure 24:
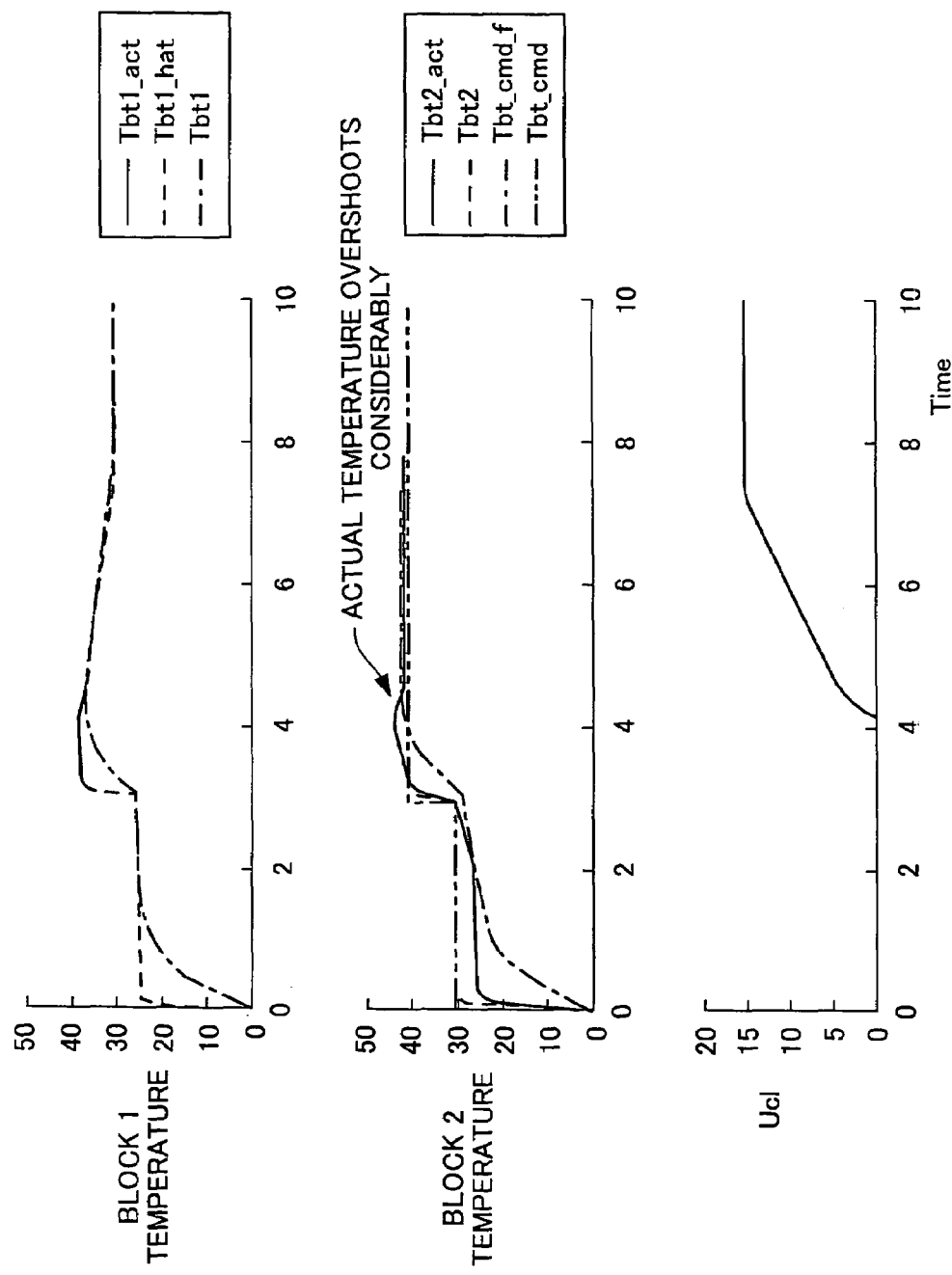
FIG. 24 is a set of graphs showing simulation results in the case of not using the configuration according to the fourth embodiment shown in FIG. 23.

FIG. 24 shows the temperature control simulation results when the temperature sensor output Tb1 is used directly instead of Tb1_hat of the battery block 2 heat model 80a8 of Equation 3-19. FIG. 25 shows the simulation results of the fourth embodiment.

As can be seen from FIG. 24, in the case of the illustrated configuration, the actual temperature Tbt2_act of the block 2 overshoots considerably owing to the response delay of the temperature sensor 76a. This overshoot is liable to damage the battery 90 should it become still larger or occur continuously. On the other hand, in the case of the configuration of the fourth embodiment shown in FIG. 25, it can be seen that overshoot is held to a minimal level so that excellent battery protection is realized.

As explained in the foregoing, the plant temperature control system according to the fourth embodiment is equipped with the temperature sensor 76a for producing an output indicative of the temperature Tbt of the battery (plant) 90, the battery block 1 heat model 80a7 and battery block 2 heat model 80a8 (plant models) for calculating the estimated value Tcat_hat of the plant temperature, the temperature sensor model 80a10 responsive to input of the calculated plant temperature estimated value for calculating the temperature sensor output estimated value Tbt_sm, and the temperature controller 80a9 for controlling the plant temperature based on the calculated plant temperature estimated value, and is further equipped with the model parameter corrector 80a11 for correcting the parameter of the plant model so as to minimize error Ebt between the temperature sensor output Tbt and the calculated temperature sensor output estimated value Tbt_sm.

Owing to this configuration, even in the case where the temperature sensor 76a has a large response delay, the temperature estimated value by the plant model can nevertheless be corrected with high accuracy to enable control of the temperature of the battery (plant) 90 to the desired value without, for example, causing severe overshooting. Further, the plant is the rechargeable battery 90, so that in addition to the advantageous effects explained earlier, it is further possible to ensure that the battery temperature does not rise to a high level even temporarily, whereby degradation of the performance of the battery 90 can be prevented.

The battery 90 is partitioned into m-number (m>2, more specifically m=2) of blocks, the plant model comprises m-number of block heat models (battery block 1 heat model and battery block 2 heat model) for calculating the temperature estimated value of each of the m-number of blocks, the model parameter corrector 80a11 corrects each of the m-number of block heat model parameters (Equations 3-15 and 3-19) based on the output of the temperature sensor(s) 76a mounted on at least one of the at least m-number of blocks, more specifically on the block 1 on the upstream side relative to the flow of coolant.

Owing to this configuration, not only can the advantageous effects explained earlier be achieved but, even in the case where the battery 90 is one of large capacity liable to experience variation in cooling condition, it is further possible to prevent the temperature of any of the different regions of the battery 90 from rising to a high level even temporarily without many temperature sensors. As a result, the service life of the battery 90 can be prolonged. Although the m-number of battery blocks has been explained as being two blocks, this is not a limitation and the number of blocks can instead be three or more.

The temperature controller 80a9 controls the temperature of each of the m-number of blocks based on the temperature estimated value Tbt2_hat calculated by the block heat model (battery block 2 heat model) of the block or blocks not equipped with a heat sensor (block 2) among the m-number of blocks. Owing to this configuration, the aforesaid advantageous effects can be achieved with a substantially smaller number of the temperature sensors 76a.

Although control has been explained as being conducted by use of simplified sliding mode control, this is not a limitation and it is alternatively possible to use some other type of backstepping control algorithm or to use adaptive control, PID control or the like.

Moreover, the foregoing variable shift system, variable compression ratio mechanism and variable phase mechanism are not limited to those shown in the drawings.

Japanese Patent Application No. 2004-381323 filed on Dec. 28, 2004 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling temperature of a plant, comprising:

a temperature sensor producing an output indicative of a temperature of the plant;

a plant model calculating a temperature estimated value of the plant;

a temperature sensor model inputting the calculated temperature estimated value of the plant and calculating an output estimated value of the temperature sensor;

a temperature controller controlling the temperature of the plant based on the calculated temperature estimated value of the plant; and a model parameter corrector correcting a parameter of the plant model so as to minimize error between the output of the temperature sensor and the calculated output estimated value of the temperature sensor.

2. The system according to claim 1, wherein the plant is an exhaust system of an internal combustion engine.

3. The system according to claim 2, wherein the plant model comprises:

an exhaust system heat model estimating a temperature of the exhaust system upstream of a catalytic converter installed in the exhaust system; and a catalyst heat model calculating the temperature estimated value of the catalytic converter;

and the model parameter corrector corrects the parameter of the catalyst heat model based on at least the output of the temperature sensor.

4. The system according to claim 1, wherein the plant is a rechargeable battery.

5. The system according to claim 4, wherein the battery is partitioned into m-number ($m \geq 2$) of blocks, and the plant model comprises;

m-number of block heat models calculating the temperature estimated value of each of the m-number of blocks;

and the model parameter corrector corrects a parameter of each of the m-number of block heat models based on the output of the temperature sensor mounted on at least one of the at least m-number of blocks.

6. The system according to claim 5, wherein the temperature controller controls the temperature of each of the m-number of blocks based on the temperature estimated value calculated by the block heat model.

7. The system according to claim 3, wherein the temperature controller determines a control input based on the calculated temperature estimated value.

8. The system according to claim 6, wherein the temperature controller determines a control input based on the calculated temperature estimated value.

* * * * *